US 7,027,183 B2

(12) United States Patent
Ohshima

(10) Patent No.: US 7,027,183 B2
(45) Date of Patent: Apr. 11, 2006

(54) IMAGE PROCESSING APPARATUS AND METHOD ALLOWING CONTROL OF DEGREE OF EDGE ENHANCEMENT

(75) Inventor: Seiji Ohshima, Itami (JP)

(73) Assignee: Minolta Co., Ltd., Osaka (JP)

( * ) Notice: Subject to any disclaimer, the term of this patent is extended or adjusted under 35 U.S.C. 154(b) by 846 days.

(21) Appl. No.: 09/874,125

(22) Filed: Jun. 6, 2001

(65) Prior Publication Data

US 2001/0050780 A1    Dec. 13, 2001

(30) Foreign Application Priority Data

Jun. 8, 2000    (JP)    ............................. 2000-172200
Nov. 15, 2000   (JP)    ............................. 2000-348185

(51) Int. Cl.
    *G06K 15/00*    (2006.01)
(52) U.S. Cl. .................... 358/1.9; 358/3.21; 358/3.22; 382/270
(58) Field of Classification Search ............... 358/2.99, 358/3.01, 3.06, 3.21, 3.22, 3.24, 465, 466; 382/270
    See application file for complete search history.

(56) References Cited

U.S. PATENT DOCUMENTS

| 4,194,221 | A |   | 3/1980 | Stoffel |
| 4,668,995 | A |   | 5/1987 | Chen et al. |
| 4,955,065 | A |   | 9/1990 | Ulichney |
| 5,014,333 | A |   | 5/1991 | Miller et al. |
| 5,031,050 | A |   | 7/1991 | Chan |
| 5,045,952 | A |   | 9/1991 | Eschbach |
| 5,325,211 | A |   | 6/1994 | Eschbach |
| 5,553,166 | A | * | 9/1996 | Kakutani ..................... 382/252 |
| 5,610,999 | A | * | 3/1997 | Bannai et al. ............... 382/272 |
| 6,614,556 | B1 | * | 9/2003 | Hong et al. ................. 358/3.03 |
| 6,625,327 | B1 | * | 9/2003 | Ohshima et al. ............ 382/270 |

* cited by examiner

*Primary Examiner*—Tommy Lee
(74) *Attorney, Agent, or Firm*—Buchanan Ingersoll PC

(57) ABSTRACT

An image forming apparatus capable of solving problems experienced in the error diffusion method operates in the following manner. An input pixel value is thresholded by a corrected threshold value, and a binarized pixel value is output. From the output value, the corrected threshold value is subtracted, the result is multiplied by a feedback coefficient β, and the result is diffused to the threshold values of surrounding pixels. As the threshold value and a scale of the pixel value are changed by the processing unit before thresholding, degree of edge enhancement is controlled.

15 Claims, 43 Drawing Sheets

F I G. 2

|  |  | O | 32 | 8 |
|---|---|---|---|---|
| 2 | 16 | 32 | 16 | 4 |
| 1 | 4 | 8 | 2 | 1 |

FIG. 12

EXAMPLES OF RELATION BETWEEN THE RATIO OF SET COEFFICIENTS AND DEGREE OF EDGE ENHANCEMENT

| DEGREE OF EDGE ENHANCEMENT | RELATION BETWEEN COEFFICIENTS a AND b |
|---|---|
| STRONGER | a > b |
| ↑ | |
| COMPARABLE TO COMMON THRESHOLD VALUE DIFFUSION | a = b |
| ↓ | |
| WEAKER | a < b |

FIG. 13

TABLE OF CONDITIONS FOR COEFFICIENT SETTING

| | COEFFICIENT a | COEFFICIENT b | a／b | $\beta$ |
|---|---|---|---|---|
| EXAMPLE 1 | 0.1 | 1 | 0.1 | 0.08 |
| EXAMPLE 2 | 1 | 1 | 1 | 0.5 |
| EXAMPLE 3 | 2 | 1 | 2 | 0.68 |

FIG. 17

| | COEFFICIENT a | COEFFICIENT b | a／b |
|---|---|---|---|
| EXAMPLE 1' | 1 | 10 | 0.1 |
| EXAMPLE 2' | 1 | 1 | 1 |
| EXAMPLE 3' | 1 | 0.5 | 2 |

|  | COEFFICIENT a | COEFFICIENT b | a／b |
|---|---|---|---|
| EXAMPLE 1″ | 0.5 | 5 | 0.1 |
| EXAMPLE 2″ | 2 | 2 | 1 |
| EXAMPLE 3″ | 4 | 2 | 2 |

WHEN a = 3, b = 1

INPUT    THRESHOLD VALUE

WHEN a = 0.5, b = 1

INPUT    THRESHOLD VALUE

FIG. 27

EXAMPLES OF RELATION BETWEEN THE VALUE OF SET COEFFICIENTS AND DEGREE OF EDGE ENHANCEMENT

| DEGREE OF EDGE ENHANCEMENT | COEFFICIENTS a |
|---|---|
| STRONGER | $a > 0$ |
| ↑ | |
| COMPARABLE TO COMMON THRESHOLD VALUE DIFFUSION | $a = 0$ |
| ↓ | |
| WEAKER | $a < 0$ |

FIG. 28

TABLE OF SET COEFFICIENT VALUES

| | COEFFICIENT a | |
|---|---|---|
| RESULT 1 | 0.5 | STRONG EDGE ENHANCEMENT |
| RESULT 2 | 0.2 | ↑ |
| RESULT 3 | 0 | STANDARD THRESHOLD VALUE DIFFUSION |
| RESULT 4 | −1 | ↓ |
| RESULT 5 | −5 | WEAK EDGE ENHANCEMENT |
| ERROR DIFFUSION | − | STANDARD ERROR VALUE DIFFUSION |

RESULT 1

RESULT 2

RESULT 3

RESULT 4

RESULT 5

ERROR DIFFUSION

| | WEAK | | | STRONG |
|---|---|---|---|---|
| A | −1 | 0 | 1 | 2 | 3 |
| B | −1 | −0.25 | 0.5 | 1.25 | 2 |

β = 0.5 (STANDARD THRESHOLD VALUE DIFFUSION)

| | WEAK | | STD | | STRONG |
|---|---|---|---|---|---|
| A | −1 | 0 | 1 | 2 | 3 |
| B | −1 | −0.5 | 0 | 0.5 | 1 |

β = 0.75

| | WEAK | | STRONG | STRONG | STRONG |
|---|---|---|---|---|---|
| A | −1 | 0 | 1 | 2 | 3 |
| B | −1 | −0.75 | −0.5 | −0.25 | 0 |

FIG. 38

TABLE OF SET COEFFICIENT VALUES (IN RESULTS 1 TO 5, $\beta = 0.5$)

| | COEFFICIENT A | COEFFICIENT B | |
|---|---|---|---|
| RESULT 1 | 3 | 1 | STRONG EDGE ENHANCEMENT |
| RESULT 2 | 2 | 0.5 | ↑ |
| RESULT 3 | 1 | 0 | STANDARD THRESHOLD VALUE DIFFUSION |
| RESULT 4 | 0 | -0.5 | ↓ |
| RESULT 5 | -1 | -1 | WEAK EDGE ENHANCEMENT |
| ERROR DIFFUSION | - | - | STANDARD ERROR VALUE DIFFUSION |

RESULT 1

RESULT 2

RESULT 3

RESULT 4

RESULT 5

F I G. 44

| | COEFFICIENT A | COEFFICIENT B | COEFFICIENT β | |
|---|---|---|---|---|
| RESULT 6 | 3 | 2 | 0.25 | STRONG EDGE ENHANCEMENT |
| RESULT 7 | −1 | −1 | 0.25 | WEAK |
| RESULT 8 | 3 | 0 | 0.75 | STRONG EDGE ENHANCEMENT |
| RESULT 9 | −1 | −1 | 0.75 | WEAK |

RESULT 6

RESULT 7

RESULT 8

RESULT 9

IMAGE PROCESSING APPARATUS AND METHOD ALLOWING CONTROL OF DEGREE OF EDGE ENHANCEMENT

This application is based on application Nos. 2000-172200 and 2000-348185 filed in Japan, the contents of which are hereby incorporated by reference.

BACKGROUND OF THE INVENTION

1. Field of the Invention

The present invention relates to method and apparatus of image processing, and, more specifically, to method and apparatus of image processing capable of performing gradation reducing process in which number of gradations of image data is reduced, by using threshold values.

2. Description of the Related Art

Handling of images in digital manner is currently dominant in the field of image processing. It is often the case that for displaying or outputting digital image, it becomes necessary to display gradations of the image in smaller number of gradation levels, because of restrictions imposed by characteristics of an output device and the like. From the early stages of development, various methods of digital half toning image processing such as binarization, in which gradations are reproduced solely by white and black dots as a pseudo halftone processing, has been studied.

Various methods including ordered dither method and error diffusion method, which are still utilized at present, as well as descendents of these methods have been developed and improved from 1960's. Further, as the hardware of computation has been developed recently, a method of directly performing optimal search for pixel arrangement, such as the method of cost minimization, has been developed.

These methods of half toning have respective advantages and disadvantages in accordance with the objects of use, and therefore various problems and solutions for respective methods have been studied. For example, the ordered dither method is simple and easy to use, while reproduced image quality is not very good. Though load of computation is heavier in the error diffusion method than the dither method, image quality is better.

In the method of directly performing optimal search such as the method of cost minimization, various optimization methods such as neural network, genetic algorithm and simulated annealing are utilized. Adoption of such a method facilitates incorporation of a visual model or an output device model into the process, enlarging degree of freedom in the processing. On the other hand, as the optimal state is searched through repetitive operations, load becomes formidable.

The problems change along with the development of technology. The problem of formidable load experienced when the method of directly performing optimal search is used may be solved by the development of hardware defining the speed of calculation. From the viewpoint of promoting wide spread use of simple and high quality output devices, however, simpler calculation process is desired.

Further, there are the problem of trade off between resolution and gradation common to all the methods. This problem may possibly be solved by increased output gradation levels or improved resolution characteristic of the output device itself. It is expected, however, that there will be increased occasions where characters are processed as images, and such processing should desirably be done in the simplest manner possible.

Conventionally, methods of improving image processing have been studied, including a method in which an image region of which gradation is of importance and an image region of which resolution is of importance are determined and the method of processing is changed in accordance with the result of determination for respective regions, and a method in which a plurality of processing methods are combined. These methods are hardly said to be simple methods, as a new process of region determination, for example, must be developed and added to execute such methods. Considering balance with the hardware (output device), it is desirable that satisfactory resolution and gradation are both attained through such a method that is comparable to the error diffusion method.

FIG. 49 is a block diagram showing a configuration of a conventional image processing apparatus executing the error diffusion method.

Referring to the figure, the image processing apparatus includes: an input unit 501 receiving as an input a pixel value of one pixel of a multi-value image; a subtractor 503 subtracting diffused error from the input pixel value; an output unit 505 outputting, as a corrected pixel value, an output from subtractor 503; thresholding unit 507 performing thresholding on the output of output unit 505 to provide binary data; an output unit 509 outputting, as pixel data, the output of thresholding unit 507; a subtractor 511 subtracting the output of output unit 505 from the output of thresholding unit 507; and an error memory 513 for diffusing the output result from subtractor 511 to pixels around a pixel which is the object of processing (pixel of interest).

The image formed through error diffusion method has a particular texture. The texture is not very noticeable visually, as it has blue noise characteristic. A method of setting dither pattern to attain the blue noise characteristic in a simple manner has been studied for the dither method as well. In the error diffusion method, however, dot patterns are adaptively generated with respect to the input image, and therefore characteristic of the input image is better reflected than the dither method.

In this point, the error diffusion method is superior in image quality to dither method. The error diffusion method, however, has its particular noise. Namely, there occurs a phenomenon in which variation in texture at a region where gradation changes moderately results in an apparent border line where there is no border (texture shift), or a phenomenon in which white or black dots tend to appear in a line at a region where the gradation is close to black or white.

Various methods for improving have been developed to prevent these phenomena, including modulation of weight coefficient and threshold value for error diffusion. As to resolution, though inherent edge enhancement characteristic has been pointed out, it is not sufficient.

Further, from the nature of its algorithm, the error diffusion method functions to reproduce pixel values of the input image in averaging manner. More specifically, the method functions to reproduce local 0th order component of the image. Accordingly, the error diffusion method has been improved to enhance components of 1st and higher order.

SUMMARY OF THE INVENTION

An object of the present invention is to solve the problems of the above described methods of image processing, and to provide apparatus and method of image processing capable of improving image quality.

The above described objects can be attained by an image processing apparatus in accordance with an aspect of the present invention, including an input unit successively receiving as inputs, a first image signal representing density level of each pixel; a thresholding unit comparing the first image signal input through the input means with a threshold value to generate a second image signal; a calculating unit calculating, based on the second image signal generated by the thresholding unit and the threshold value used for generating the second image signal, a threshold value to be used for thresholding a succeeding pixel; and a changing unit for enlarging or reducing at least one of a range of the first image signal input through the input means and a range of the threshold value calculated by the calculating unit.

Preferably, the changing unit changes the range of the first image signal input through the input means, and it includes a variable unit changing a coefficient used for changing the range.

Preferably, the image processing apparatus changes method of calculating the threshold value by the calculating unit, in accordance with the coefficient changed by the variable unit.

Preferably, the changing unit changes the range of the threshold value calculated by the calculating unit, and it includes a variable unit changing a coefficient used for changing the range.

Preferably, the image processing apparatus changes the method of calculating the threshold value by the calculating unit, in accordance with the coefficient changed by the variable unit.

According to another aspect, a method of image processing includes: an input step of successively receiving as inputs a first image signal representing density level of each pixel; a thresholding step of comparing the first image signal input in the input step with a threshold value to generate a second image signal; a calculating step of calculating, based on the second image signal generated in the thresholding step and the threshold value used for generating the second image signal, a threshold value to be used for thresholding a succeeding pixel; and a changing step of enlarging or reducing at least one of a range of the first image signal input through the input step and a range of the threshold value calculated in the calculating step.

According to a still further aspect of the present invention, the image processing apparatus includes: an input unit successively receiving as inputs a first image signal representing density level of each pixel; a thresholding unit generating a second image signal by comparing the first image signal input through the input unit with a threshold value; a calculating unit calculating, based on the second image signal generated by the thresholding unit and the threshold value used for generating the second image signal, a threshold value to be used for thresholding a succeeding image; and a changing unit for changing the ratio of a range of the first image signal input through the input means to the range of the threshold value calculated by the calculating unit.

According to a still further aspect of the present invention, the image processing apparatus includes: an input unit successively receiving as inputs a first image signal representing density level of each pixel; a thresholding unit generating a second image signal by comparing the first image signal input through the input unit with a threshold value; and a calculating unit calculating, based on the first image signal, the second image signal and the threshold value used for generating the second image signal, a threshold value to be used for thresholding the succeeding pixel.

Preferably, the calculating means calculates the threshold value, using difference between the second image signal and the threshold value used for generating the second image signal, and difference between the first and second image signals, as parameters.

Preferably, the image processing apparatus multiplies the difference between the first and second image signals by a prescribed coefficient.

Preferably, the coefficient can be arbitrarily changed.

Preferably, the image processing apparatus further includes a first multiplying unit multiplying the first image signal input to the thresholding unit by a prescribed first coefficient, and a second multiplying unit multiplying the first image signal input to the calculating unit by a prescribed second coefficient.

Preferably, at least one of the first and second coefficients can be arbitrarily changed.

According to a still further aspect, the method of image processing includes: an input step of successively receiving as inputs a first image signal representing density level of each pixel; a thresholding step of generating a second image signal by comparing the first image signal input in the input step with a threshold value; and a calculating step of calculating, based on the first image signal, the second image signal used for generating the second image signal, a threshold value to be used for the thresholding a succeeding pixel.

According to a still further aspect of the present invention, the image processing apparatus includes: an input unit successively receiving as inputs a first image signal representing density level of each pixel; a first multiplying unit multiplying the input first image signal by a prescribed first coefficient; a second multiplying unit multiplying the input first image signal by a prescribed second coefficient; a thresholding unit generating a second image signal by comparing an output of the first multiplying unit with a threshold value including an output of the second multiplying unit; and a calculating unit calculating, based on the second image signal generated by the threshold value generating unit and the threshold value used for generating the second image signal, a threshold value to be used for the thresholding a succeeding pixel.

Preferably, in the image processing apparatus, at least one of the first and second coefficients can be set by a user.

Preferably, the first or the second coefficient is changed dependent on an area or characteristic of the image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 illustrates function of a correction value memory 119.

FIG. 12 shows a relation between a coefficient and degree of edge enhancement.

FIG. 13 shows a specific example of coefficient setting condition.

FIGS. 17 and 18 represent specific examples of the coefficient setting condition.

FIGS. 19 to 21 show processing at processing unit a and processing unit b.

FIG. 27 shows a relation between the set coefficient value and degree of edge enhancement.

FIG. 28 shows an example of coefficient setting.

FIGS. 37 and 38 represent examples of coefficient setting.

FIG. 44 shows an example of coefficient setting.

DESCRIPTION OF THE PREFERRED EMBODIMENTS

[Reference Example]

Figure 1:
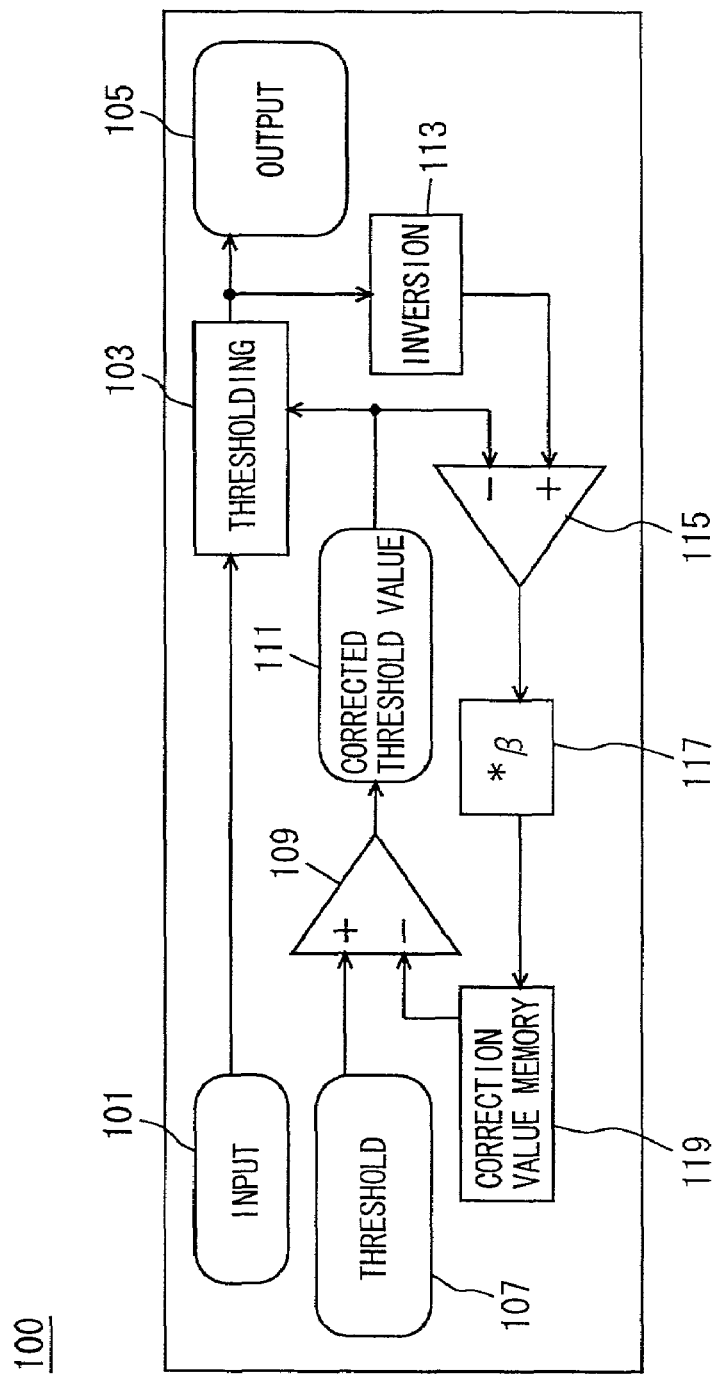
FIG. 1 is a block diagram representing a configuration of an image forming apparatus in accordance with a reference example of the present invention.

FIG. 1 is a block diagram representing a configuration of an image forming apparatus in accordance with a reference example of the present invention. Image binarizing process performed by the apparatus will be referred to as "threshold value diffusion method." In the figures of the present application, portions surrounded by the normal rectangles represent portions performing some operations, while portions surrounded by rounded rectangles represent portions which do not perform any operation but simply provides values.

Referring to the figure, the image forming apparatus includes an image (pixel value) input unit 101, a thresholding unit 103, a binary image output unit 105, an inverting unit 113, initial threshold value generating unit 107, a subtracting unit 109, a corrected threshold value output unit 111, a subtracting unit 115, a coefficient multiplying unit 117 and a correction value memory 119.

One pixel value (0~1) of a multi-value image is input to image input unit 101. When a multi-value image n of 256 gradations (0~255) is to be handled, for example, a normalized value normalized to 0~1 (n/255) is input to image input unit 101. Thresholding unit 103 compares a corrected threshold value Th (x) output from corrected threshold value output unit 111 with the pixel value input to image input unit 101. When pixel value≧corrected threshold value Th (x), thresholding unit 103 outputs "1" and, when pixel value<corrected threshold value Th (x), thresholding unit 103 outputs "0". Consequently, binary image output unit 105 outputs an image having binary value of "0" or "1".

Initial threshold value generating unit 107 outputs an initial threshold value Th (x) before correction. The initial threshold value Th (x) before correction may be a constant value, or it may be varied in accordance with the position of the pixel so as to provide a dither pattern.

Subtractor 109 reads a correction value stored in correction value memory 119 which corresponds to the pixel of the object of processing (pixel of interest), and subtracts the correction value from the initial threshold value Th (x). The result is the corrected threshold value Th (x).

Inverting unit 113 inverts an output from thresholding unit 103. More specifically, when the output from thresholding unit 103 is "0", inverting unit 113 outputs "1", and when the output is "1", provides "0".

Subtracting unit 115 subtracts corrected threshold value Th (x) from the output of inverting unit 113, and outputs the result. Coefficient multiplying unit 117 multiplies the output of subtracting unit 115 by a feed back coefficient β which is set between 0 to 1, and outputs the result. When β=0, it means that the threshold value diffusion is not performed.

Figure 2:
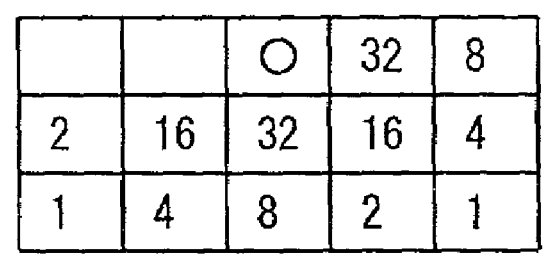

Correction value memory 119 is a memory for dispersing the output result of coefficient multiplying unit 117 to the correction value of the threshold for pixels around that pixel which is the object of processing. Referring to FIG. 2, a pixel which is the object of processing is represented by a white circle and output result from coefficient multiplying unit 117 is allocated and stored with the ratio (weight coefficient) of 1 to 32 to the correction values of threshold values of the pixels therearound.

As can be seen from FIG. 2, the number of pixels to which the output result of coefficient multiplying unit 117 is distributed is made larger as compared with the common error diffusion method, in order to prevent uniformity of values to be distributed, by increasing the types of weight coefficients for distribution. More specifically, in the error diffusion method, diffusion process is performed on widely varying input values (pixel value), while in the threshold value diffusion method, it is often the case that the diffusion process is performed on a constant or almost constant threshold value. When the initial threshold value before correction is not a constant value but widely varying, the number of pixels to which outputs are distributed may be reduced.

Figure 49:
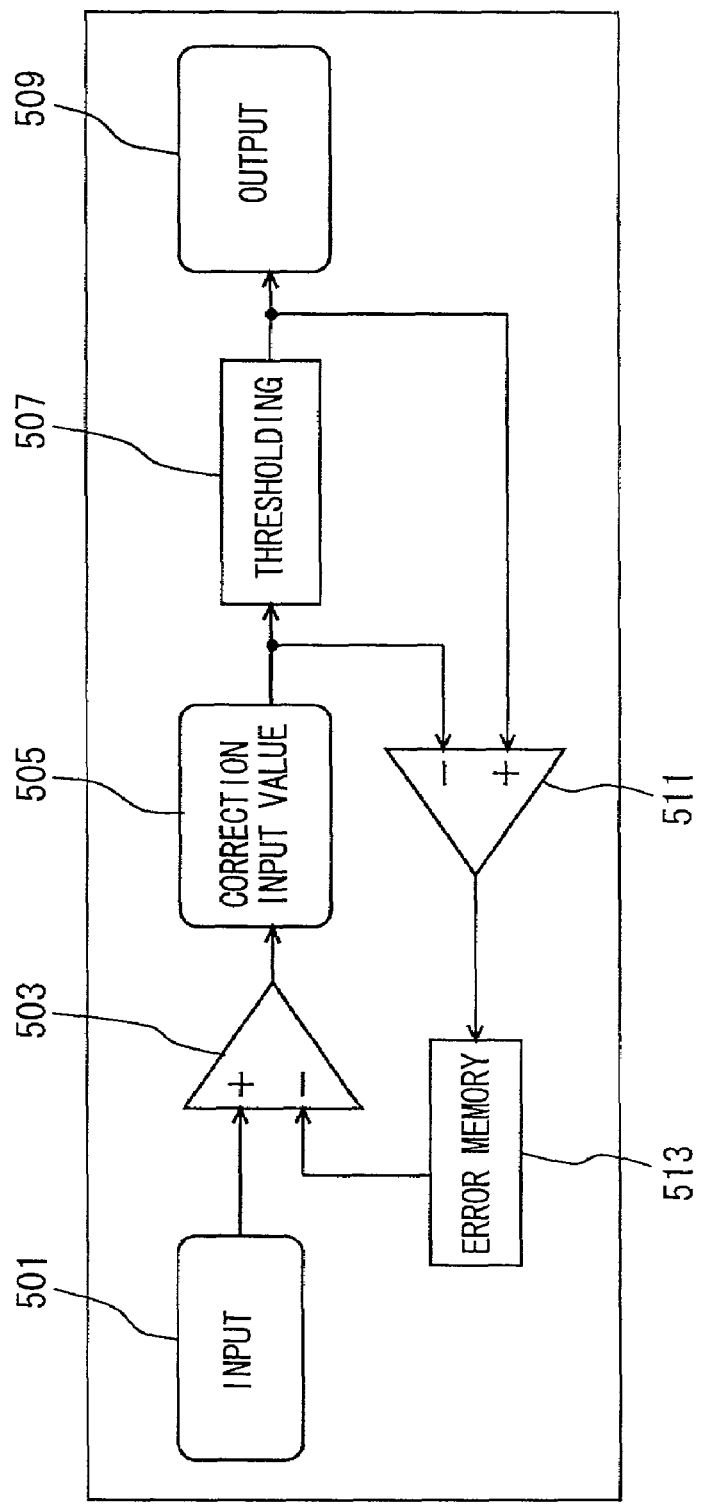
FIG. 49 represents a configuration of the image processing apparatus in accordance with the error diffusion method.

As compared with the block diagram (FIG. 49) of the image processing apparatus utilizing the error diffusion method, in the apparatus utilizing the threshold value diffusion method, inversion is performed by the inverting unit 113 when feeding back the output. This is performed as the output result is an output viewed from the input side, and hence it is necessary to change the output to one viewed from the threshold value.

Further, feed back coefficient β is multiplied in the coefficient multiplying unit 117 in feeding back the threshold value. As will be described later, this process is to effect reproduction of the input value uniformly, in the threshold value diffusion method which functions, if the feedback coefficient β is not multiplied, simply to reproduce the threshold value uniformly.

The function and effects of the threshold value diffusion method as compared with the error diffusion method will be described in the following. As can be seen from the comparison between the image processing apparatus utilizing the error diffusion method shown in FIG. 64 and the apparatus utilizing the threshold value diffusion method shown in FIG. 1, these two methods differ very much in that in the error diffusion method, difference between an input pixel value and an output is fed back to the input, whereas in the threshold value diffusion method, difference between the threshold value and the output is fed back to the threshold value. More specifically, the object of which difference from the output is calculated, and the object to which the difference is fed back, are the input value (input pixel value) in the error diffusion method, whereas in the threshold value diffusion method, it is the threshold value. It is noted that even in the threshold value diffusion method, similar texture (blue noise characteristic) to the error diffusion method can be obtained by the feed back algorithm.

Figure 3:
FIG. 3 shows result of halftone processing in accordance with ordered dither method.
Figure 4:
FIG. 4 shows a result of halftone processing in accordance with error diffusion method.
Figure 5:
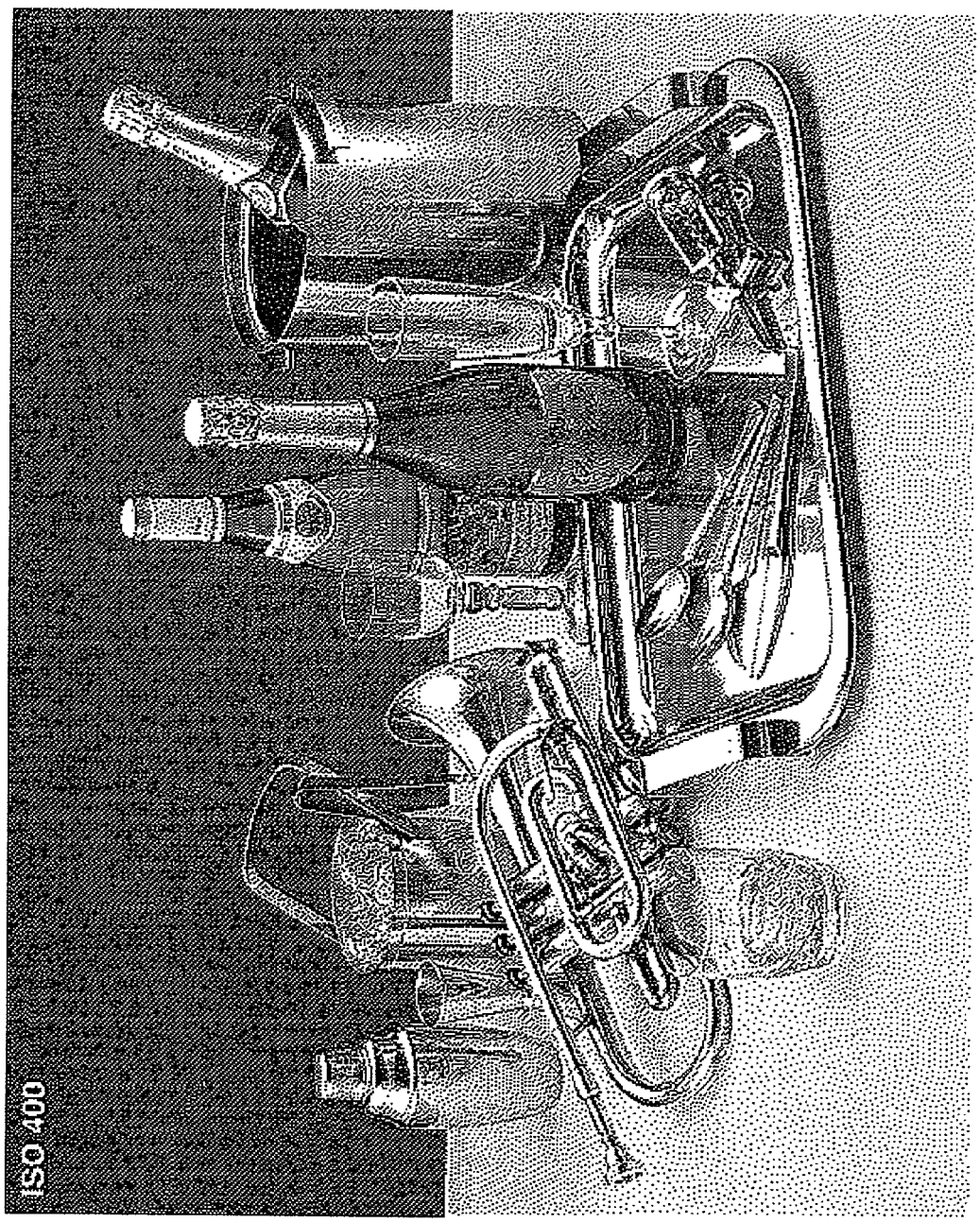
FIGS. 5 and 6 show results of halftone processing in accordance with threshold value diffusion method.

FIG. 3 represents the result of halftone processing in accordance with ordered dither method of a fat-type pattern of 4×4 pixels, FIG. 4 shows the result of halftone processing in accordance with the error diffusion method, and FIG. 5 represents the result of halftone processing in accordance with the threshold value diffusion method (feed back coefficient β=0.5), using initial threshold value Th (x) of a constant value.

Both gradation and resolution are the worst in the ordered dither method. In the error diffusion method, gradation and resolution are both better than the dither method. In the threshold value diffusion method, particularly the resolution is better than in the error diffusion method. As to gradation and texture, the results of the threshold value diffusion method are comparable to those of the error diffusion method. It is noted that in the threshold value diffusion method, texture shift as in the error diffusion method, is observed. The defect of dots aligned in a line in a region close to black or white, experienced in the error diffusion method, is not observed in the threshold value diffusion method.

Figure 6:
Figure 7:
FIG. 7 shows a result of halftone processing in accordance with error diffusion method.
Figure 8:
FIG. 8 shows a result of halftone processing in accordance with error diffusion method with edge enhancement.

FIG. 6 represents the result of halftone processing by the threshold value diffusion method (feed back coefficient β=05) using fat-type dither pattern of 4×4 pixels as the initial threshold value Th (x), FIG. 7 represents the result of halftone processing in accordance with the error diffusion method modifying the fat-type pattern of 4×4 pixels as the threshold value, and FIG. 8 represents the result of halftone processing in accordance with the error diffusion method with edge enhancement.

As the dither pattern is used as the initial threshold value Th (x) in the threshold value diffusion method, the texture shift is improved. Similar improvement is observed in the error diffusion method. In the threshold value diffusion method, however, this improvement does not affect other characteristic such as the resolution, and hence the threshold value diffusion method is still superior to the error diffusion method. By the error diffusion method with edge enhancement, resolution is improved. In this example, however, the effect is restricted by the essential function of error diffusion method, that is, average reproduction of input value, and therefore reproductivity of a thin line with low contrast, for example, is not sufficient.

The characteristics of the output image quality provided by the binarization in accordance with the threshold value diffusion method are as described above. The process producing the image quality will be discussed, based on the comparison with the error diffusion method.

In the error diffusion method, the input value is made full use of. Namely, dot arrangement is adaptively determined by using a process of feeding back an error between the output and input, to produce an image reflecting the input value. In the threshold value diffusion method, the input value is not directly related to the feed back. In the threshold value diffusion method, the input value is used simply for comparison, to determine the output value. More specifically, on ("1") or off ("0") of the output is fed back, while the input value itself is not involved in the process of feed back.

In the threshold value diffusion method, however, it is possible to reflect the input value on the output result, that is, to reproduce gradation of the input image, by setting feed back coefficient β to an appropriate value, as described above.

Further, essentially, the error diffusion method functions to reproduce, when viewed locally, the input value in average. The threshold value diffusion method is different. Though it seems disadvantageous in reproducing the input image, on the other hand, it means that the process does not tend to be restricted by the input value.

An example in which the function of the error diffusion method, that is, average reproduction of the input value has restricting influence, will be described. Assume that a gray thin line, that is, a thin line of low contrast, is on a white background. The line being gray means that the dot density is determined in accordance with the degree of the grayness. Assuming that it is 50% gray, there should be white and black dots half and half in average. As it is a thin line, if half of the dots constituting the line are made white, in an extreme case, the solid line may possibly appear as a dotted line. Namely, it is desirable in this case that the number of black dots are increased and the white dots are allocated to the periphery. The periphery, however, is originally white, and therefore no further white dots can be distributed to the periphery. More specifically, as the density of a gray thin line is reproduced in average, the characteristic of the line may be lost.

In such a case, the characteristic of the line, that is, edge characteristic of low contrast should preferably be reproduced, even if it means neglect of the gray level of the line to some extent. In the function of the error diffusion method, reproduction of local 0th order component (low frequency component) is of higher priority. Dependent on the nature of the image, however, it may be sometimes desirable to give priority to local 1st and higher order components (high frequency components). For example, where there are relatively minor unevenness existing locally, reproduction of the unevenness, that is, 1st and higher order components should be of higher priority than reproduction of the average level, that is, 0th order component. It goes without saying that at a portion of a moderate gradation, 0th order component may be reproduced.

By contrast, in the threshold diffusion method, reproduction of the local 1st and higher order components are of greater importance. Therefore, for the example of the gray thin line on a white background described above in which the function of the error diffusion method is restricting, satisfactory result can be obtained as the line edge characteristic is reproduced, by the threshold value diffusion method in which reproduction of the local 1st and higher order components is given priority.

As described above, the threshold value diffusion method functions to reproduce with priority the local 1st and higher order components of the image input value. Nevertheless, it is also possible to reproduce local 0th component by parameter setting. Further, as the algorithm, feed back similar to that of the error diffusion method is used, and therefore the texture of the output image has blue noise characteristic similar to the error diffusion method. Further, load is also comparable to that of the error diffusion method.

By the threshold value diffusion method, it becomes possible to eliminate the disadvantage of the error diffusion method that dots tend to appear in a line at a background portion of near white or black, while maintaining the output image quality comparable to that of the error diffusion method. Further, the threshold value diffusion method additionally has various advantageous such as reproduction of low contrast edge component.

In reproducing halftone by binarization, it is expected that visual characteristic will be of greater consideration. In that case, what is important is the balance between the overall characteristic of the observed image and the local characteristic. In other words, it becomes necessary to reproduce overall gradation while maintaining local correlation within the image. The reason for this is that a viewer of the image naturally takes a balance in his or her mind that both characteristics are exhibited to the maximum. Therefore, a method which can control and simply reproduce the local 0th order component and 1st and higher order components of the input image will be more necessary. The threshold value diffusion method contributes to such a method of image formation satisfying this request.

[First Embodiment]

Figure 9:
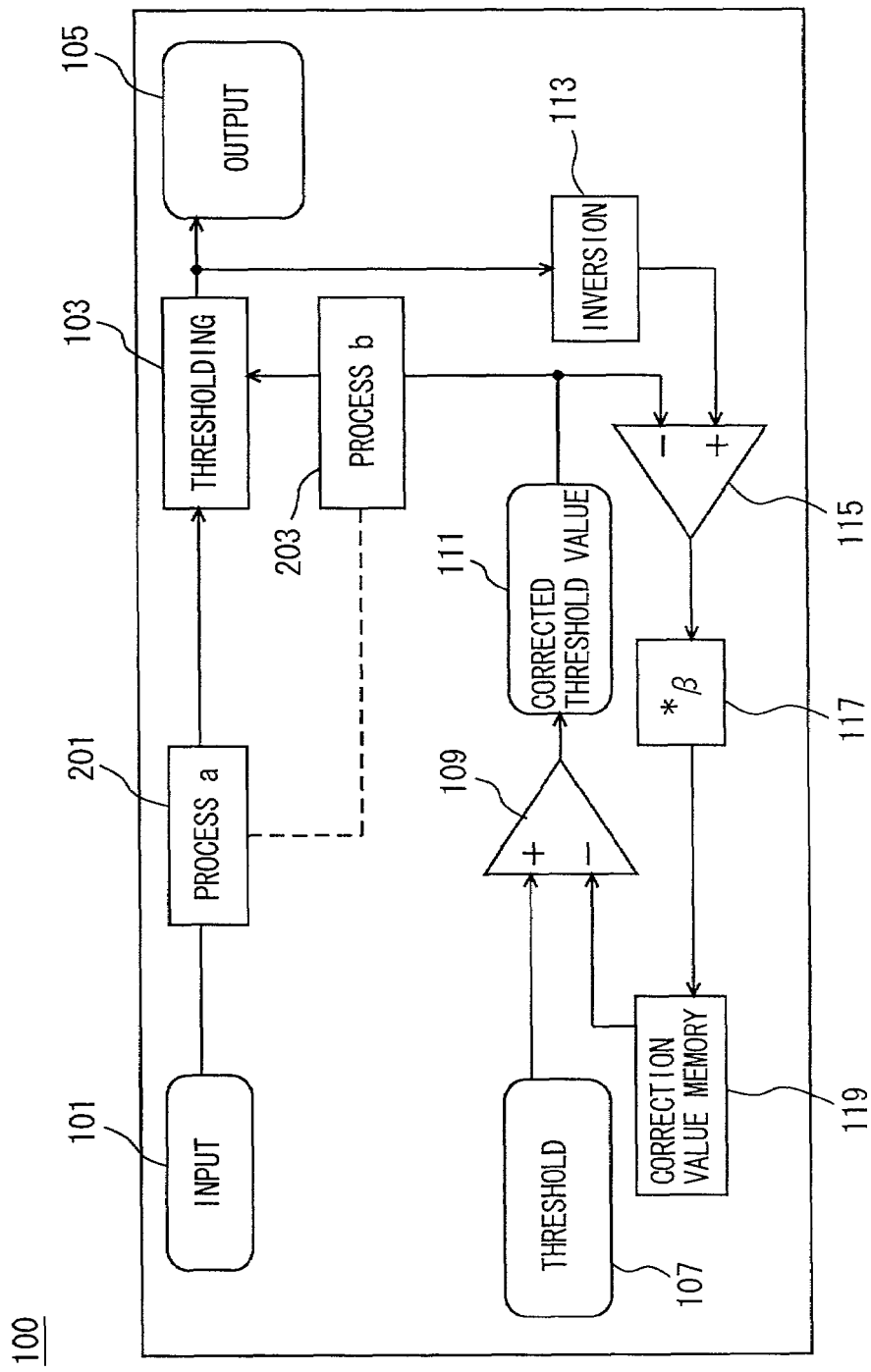
FIG. 9 is a block diagram representing a configuration of an image forming apparatus in accordance with a first embodiment of the present invention.

FIG. 9 is a block diagram representing a configuration of the image forming apparatus in accordance with the first embodiment of the present invention.

Referring to FIG. 9, in the present embodiment, the image forming apparatus includes, in addition to the configuration shown in FIG. 1, a processing unit a 201 changing the range of a pixel value (image signal) input through the image input unit 101, and a processing unit b 203 changing the range of the corrected threshold value Th (x) output by the corrected threshold value output unit 111.

It is described that in the process of the reference example (half toning process in accordance with the threshold value diffusion method), reproductivity of the resolution of the images is superior. This is because the threshold value diffusion method itself has an edge enhancement characteristic. The edge enhancement characteristic is stronger than the edge enhancement characteristic of the common error diffusion processing. The reference example, however, is disadvantageous in that the degree of edge enhancement is uncontrollable.

Therefore, in the present embodiment, the ratio of the range of the input value and the range of the threshold value is changed when the input value (image signal) is subjected to thresholding process, so as to enable control of the degree of edge enhancement.

The processing unit a 201 shown in FIG. 9 is provided for changing the range of the pixel value based on a coefficient a. The processing unit b 203 is provided for changing the range of the corrected threshold value based on the coefficient b.

Figure 10:
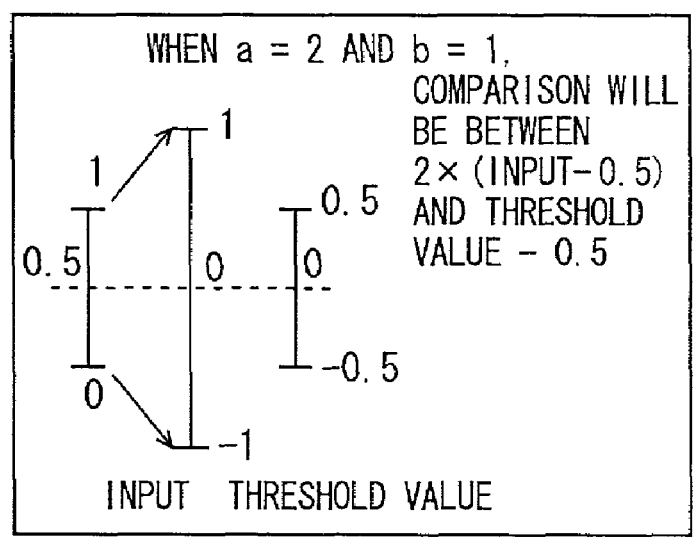
FIGS. 10 and 11 represent processing at a processing unit a and a processing unit b.

FIG. 10 is an illustration of the processes performed by the processing unit a 201 and the processing unit b 203. Referring to the figure, an example will be described in which coefficient a=2 and coefficient b=1.

Assume that an input pixel value may assume a range of the value from 0 to 1, and that the corrected threshold value Th (x) can also assume the range of the value from 0 to 1.

The pixel value input by the processing unit a 201 is changed (here, enlarged) to the range of −1 to 1.

By processing unit b 203, the corrected threshold value is shifted to have the value of −0.5 to 0.5. Then, thresholding unit 103 compares the pixel value with the range changed with the shifted threshold value.

More specifically, in the thresholding unit 103, a×(input pixel value−central value thereof) is compared with b×(corrected threshold value−central value thereof). More specifically, in the example shown in FIG. 10, a=2, b=1, the central value of the input pixel value=0.5 and the central value of corrected threshold value=0.5, and therefore, 2×(input pixel value−0.5) is compared with (corrected threshold value−0.5) in the thresholding unit 103.

Figure 11:
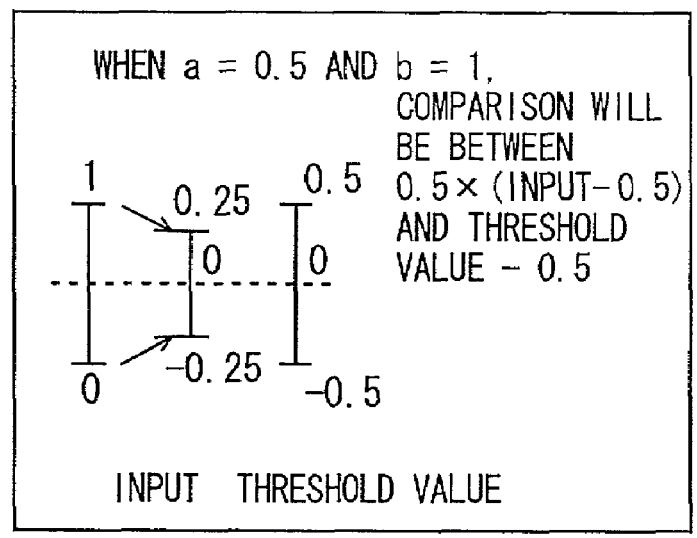

Referring to FIG. 11, when a=0.5 and b=1, 0.5×(input pixel value−0.5) is compared with (corrected threshold value−0.5) in thresholding unit 103.

As described above, the processes performed by the processing unit a 201 and processing unit b 203 in accordance with the coefficients a and b vary. However, it is preferred that the correspondence between the central value of the input pixel value and the central value of the corrected threshold value is kept unchanged before and after the processings by the processing unit a 201 and a processing unit b 203.

The coefficients a and b form a set of coefficients, and a ratio between a and b is set in advance to a specific ratio in accordance with the degree of edge enhancement characteristic. Alternatively, a plurality of sets may be prepared in the form of a table data, which may be selected by the user. In the present embodiment, by multiplying the coefficient a and/or b immediately before the thresholding process, a thresholding process can be performed with the range of each of the input value and the threshold value enlarged or reduced.

FIG. 12 shows the relation between the set ratio of the coefficients and the degree of edge enhancement.

Referring to the figure, when a=b, a process similar to the threshold value diffusing process in the reference example takes place. When a>b, the degree of edge enhancement increases. When a<b, the degree of edge enhancement decreases.

The value of each coefficient is not limited. In order to efficiently control the edge enhancement characteristic, it is desired that the ratio between the coefficients assumes a value close to 1, and one of the coefficients is set to 1. The direction decreasing the edge enhancement characteristic is the direction that is closer to the edge enhancement characteristic of the error diffusion method. When the ratio of the coefficients is changed from a=b, gradation characteristic of the output is also influenced. Therefore, it is necessary to change the feedback coefficient β as well, in accordance with the ratio.

As described above, by changing the coefficients a and b, the edge enhancement characteristic of the output image can efficiently be controlled in the present embodiment.

Figure 14:
FIGS. 14 to 16 show output images in accordance with Examples 1 to 3 of coefficient setting.
Figure 15:
Figure 16:

FIG. 13 shows specific examples (1–3) of the setting of coefficients a, b and feedback coefficient β. FIGS. 14 to 16 represent results of image output, corresponding to the set Examples 1–3.

In Example 1 of FIG. 13, the coefficients are set as coefficient a=0.1, coefficient b=1, β=0.08. At this time, a/b=0.1. Namely, there is the relation of a<b, and therefore, the edge enhancement characteristic is decreased. In this case, it is desired that the feedback coefficient β is made smaller.

In Example 2, coefficient a=coefficient b=1. Here, feedback coefficient is set to β=0.5. In this example, image processing similar to the reference example takes places, where a/b=1.

In Example 3, coefficient a=2, coefficient b=1 and feedback coefficient β=0.68. Namely, a/b=2 and there is a relation of a>b. Thus, the degree of edge enhancement is increased. Here, it is desired that the feedback coefficient β is increased.

FIG. 17 shows an example in which coefficient a is set to 1 and coefficient b is changed, different from the example of FIG. 13.

Referring to FIG. 17, in Example 1', the coefficients are a=1 and b=10, and in Example 3', the coefficients are a=1 and b=0.5. The value a/b is 0.1 and 2 in respective examples, and therefore, the same outputs as Examples 1 to 3 of FIG. 13 can be obtained in accordance with Examples 1' to 3'.

Figures 18, 19:
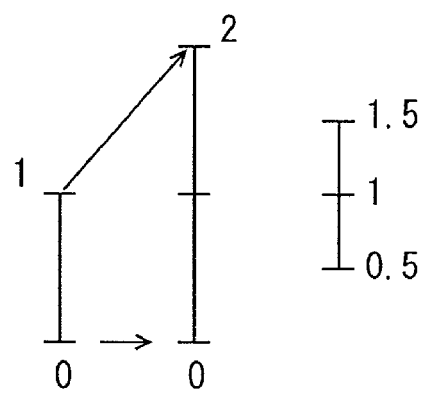

FIG. 18 shows examples in which both coefficients a and b are set to values different from 1.

Referring to FIG. 18, in Example 1", a=0.5 and b=5, and in Example 3", a=4 and b=2. Here, however, the value a/b is 0.1 and 2, respectively, and hence the same edge enhancement as in the examples of FIG. 13 can be attained in the examples of FIG. 18.

In the specific examples shown in FIGS. 10 and 11 described above, as long as the value of coefficient b is 1, the corrected threshold value have only to be shifted by −0.5, regardless of the value of coefficient a. A scaling process in which an input is simply multiplied by the coefficient a may be performed, by appropriately changing the amount of shifting the threshold value, in accordance with the value of coefficient a.

More specifically, referring to FIG. 19, when a=2 and b=1, the input pixel value may simply be multiplied by a (=2), the corrected threshold value may be shifted by +0.5 and the results may be compared.

Figure 20:
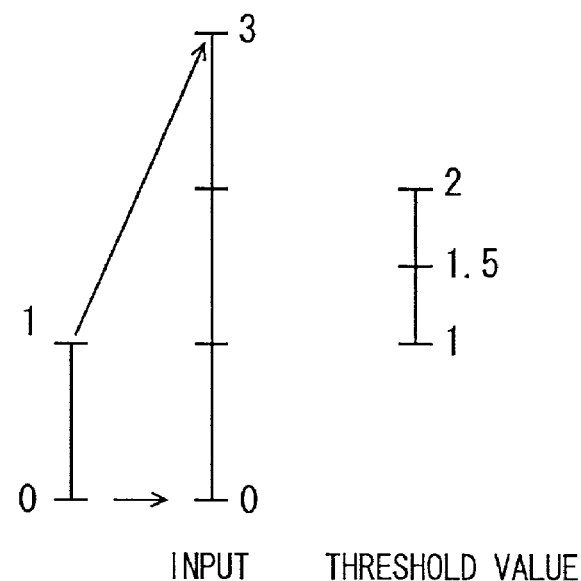

Referring to FIG. 20, when a=3 and b=1, what is necessary is to multiply the input pixel value by a (=3) and to shift the corrected threshold value by +1.

Figure 21:
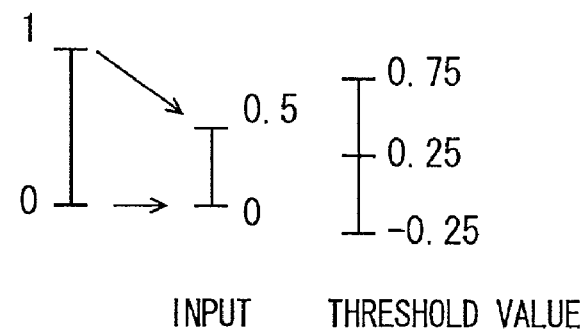

Referring to FIG. 21, when a=0.5 and b=1, what is necessary is to multiply the input pixel value by a (=0.5) and to shift the corrected threshold value by −0.25.

Figure 22:
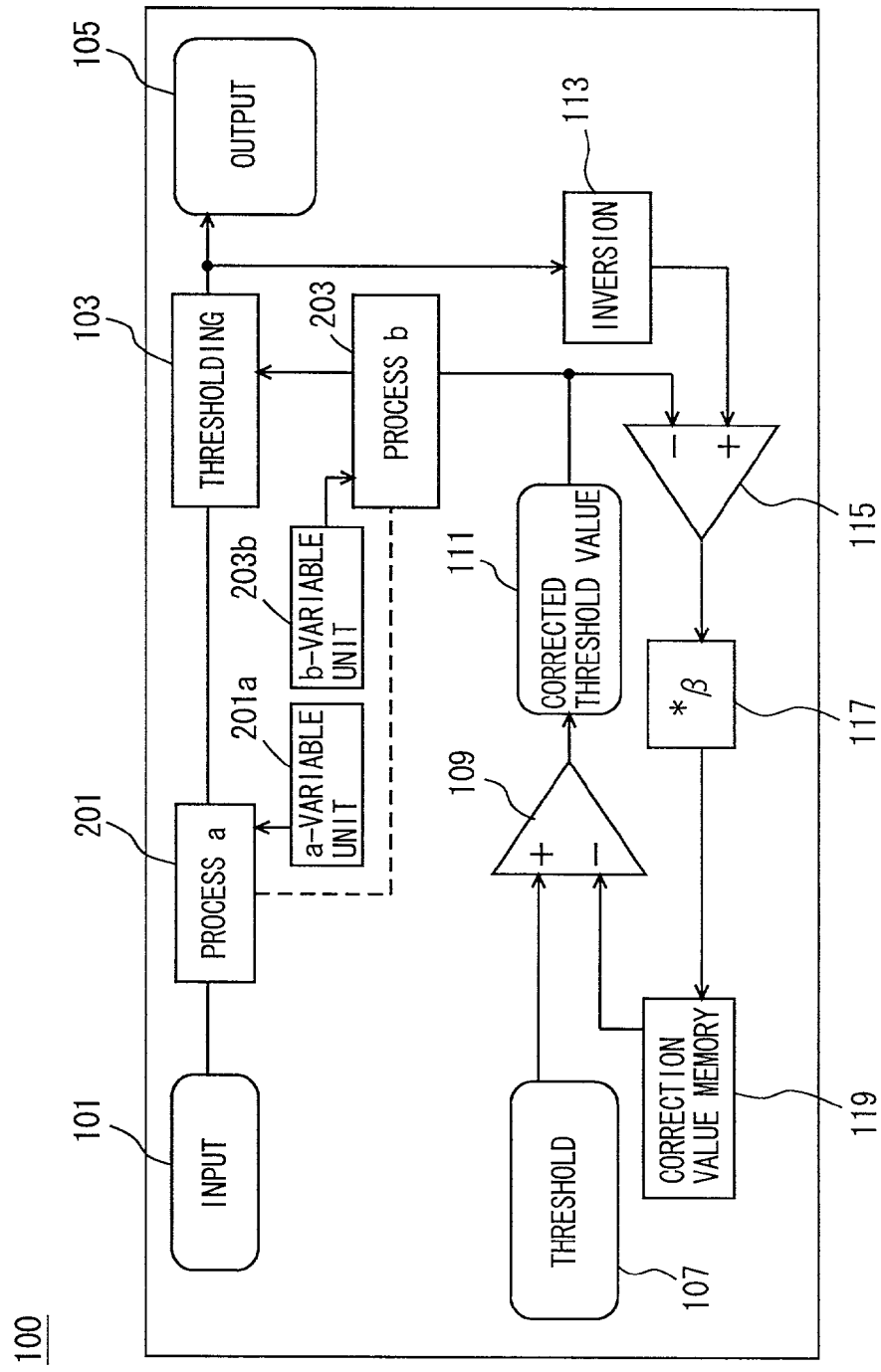
FIG. 22 is a block diagram representing a modification of the apparatus shown in FIG. 9.

Alternatively, referring to FIG. 22, an a-variable unit 201a and a b-variable unit 203b for changing the values of coefficients a and b may be provided in the image forming apparatus, and the coefficients may be changed by user setting or in accordance with the image type. Further, it is desired that the value β is automatically set in accordance with the coefficients a and b.

As described above, by the algorithm in accordance with the present embodiment, the degree of edge enhancement characteristic in the half toning process can be controlled by a simple process. This enables provision of a halftone image as desired by the user. Further, the method thereof is to simply set in advance or select at every operation, prescribed coefficients in accordance with the desired degree. Namely, at the time of execution, what is necessary for the user is to perform a simple operation of selecting a coefficient, for example, suitable for his/her intention. Further, as compared with a system in which edge enhancement process is performed separately before half toning, a system which is simpler and imposes lighter load can be provided by the present embodiment.

[Second Embodiment]

Figure 23:
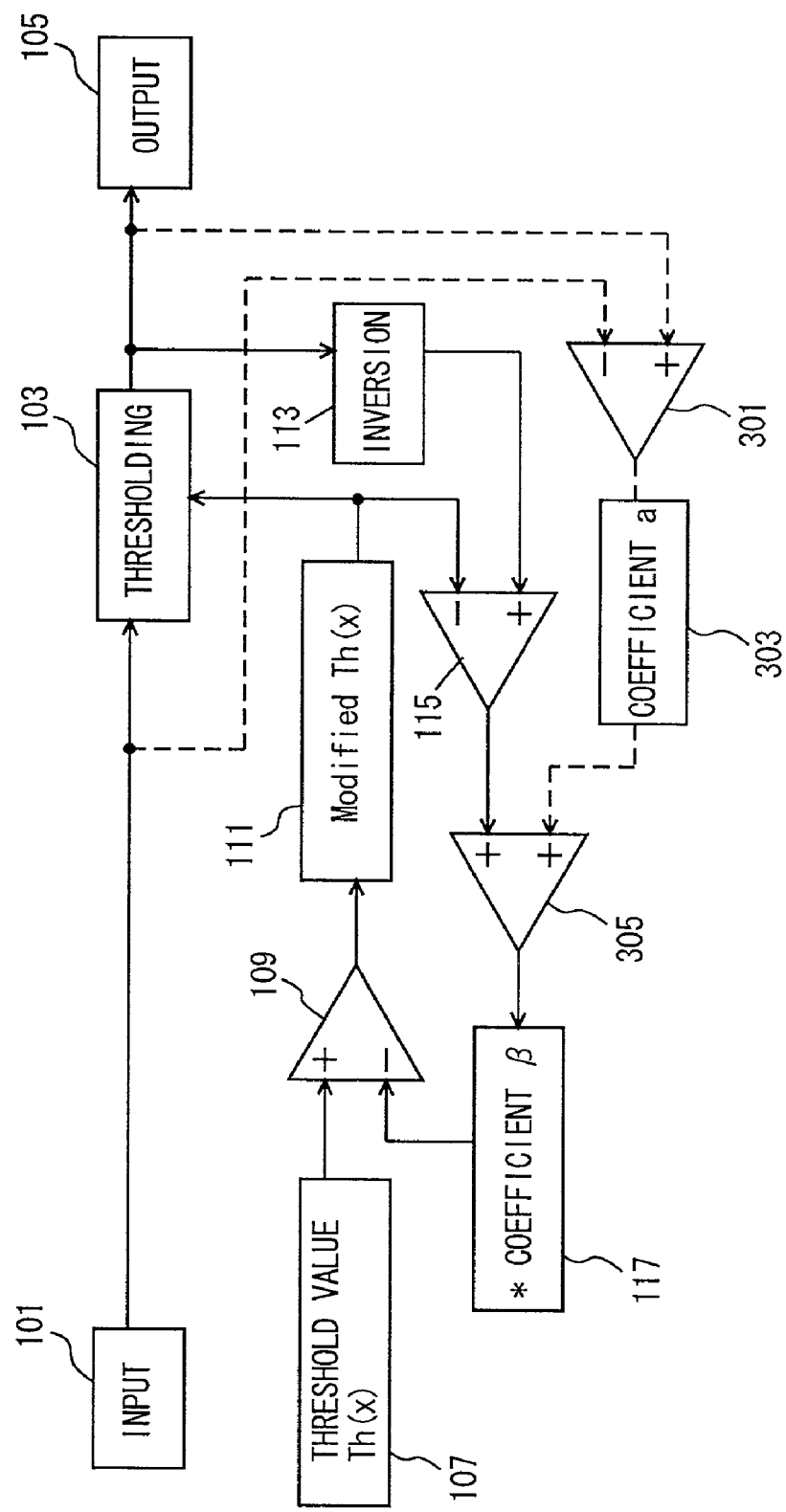
FIG. 23 shows a configuration of an image forming apparatus in accordance with the second embodiment of the present invention.

FIG. 23 is a block diagram representing a configuration of the image forming apparatus in accordance with the second embodiment of the present invention. Referring to FIG. 23, in the present embodiment, feedback routes represented by dotted lines are added to the configuration of the image forming apparatus shown in FIG. 1.

More specifically, the image forming apparatus shown in FIG. 23 includes, in addition to the configuration of the image forming apparatus shown in FIG. 1, a subtracting unit 301 subtracting a value before thresholding process (input to the image forming apparatus) from the result of thresholding process (output from the image forming apparatus), a multiplying unit 303 multiplying an output of subtracting unit 301 by the coefficient a, and an adding unit 305 adding the output of multiplying unit 303 to the output of subtracting unit 101. The correction value memory 119 of FIG. 1 is not shown in FIG. 23.

As described above, the reference example has been disadvantageous in that the degree of edge enhancement in the threshold value diffusion method was uncontrollable.

In accordance with the present embodiment, in the image forming apparatus employing the threshold diffusion method, a value obtained by multiplying a difference between an input and an output ("error" in the error diffusion method) by an appropriate coefficient a is added to a feedback value, as shown in FIG. 23 (alternatively, the value may be subtracted from the feedback value). By such a process, the degree of edge enhancement can be controlled.

The coefficient a is the coefficient to be multiplied by the error between the output and the input, and it may be a positive or a negative value. Dependent on whether the coefficient a is positive or negative, addition or subtraction to or from the normal feedback value is determined. Accordingly, whether the degree of edge enhancement is increased or decreased from the normal level is determined. Further, by the magnitude of the value of coefficient a, the degree of increase or decrease of edge enhancement is determined. Thus, the user sets the coefficient a in advance, in accordance with the desired degree of edge enhancement characteristic.

When the coefficient β is to be changed, the coefficient a may be calculated accordingly, or values may be prepared in advance in the form of a table data, and the coefficient a corresponding to the coefficient β may be selected. In other words, the coefficient a may be determined, based on the coefficient β.

As to the algorithm, it is possible to form a different operating circuit which is mathematically equivalent to that of FIG. 23. Such circuitry is also covered by the present invention.

Figure 24:
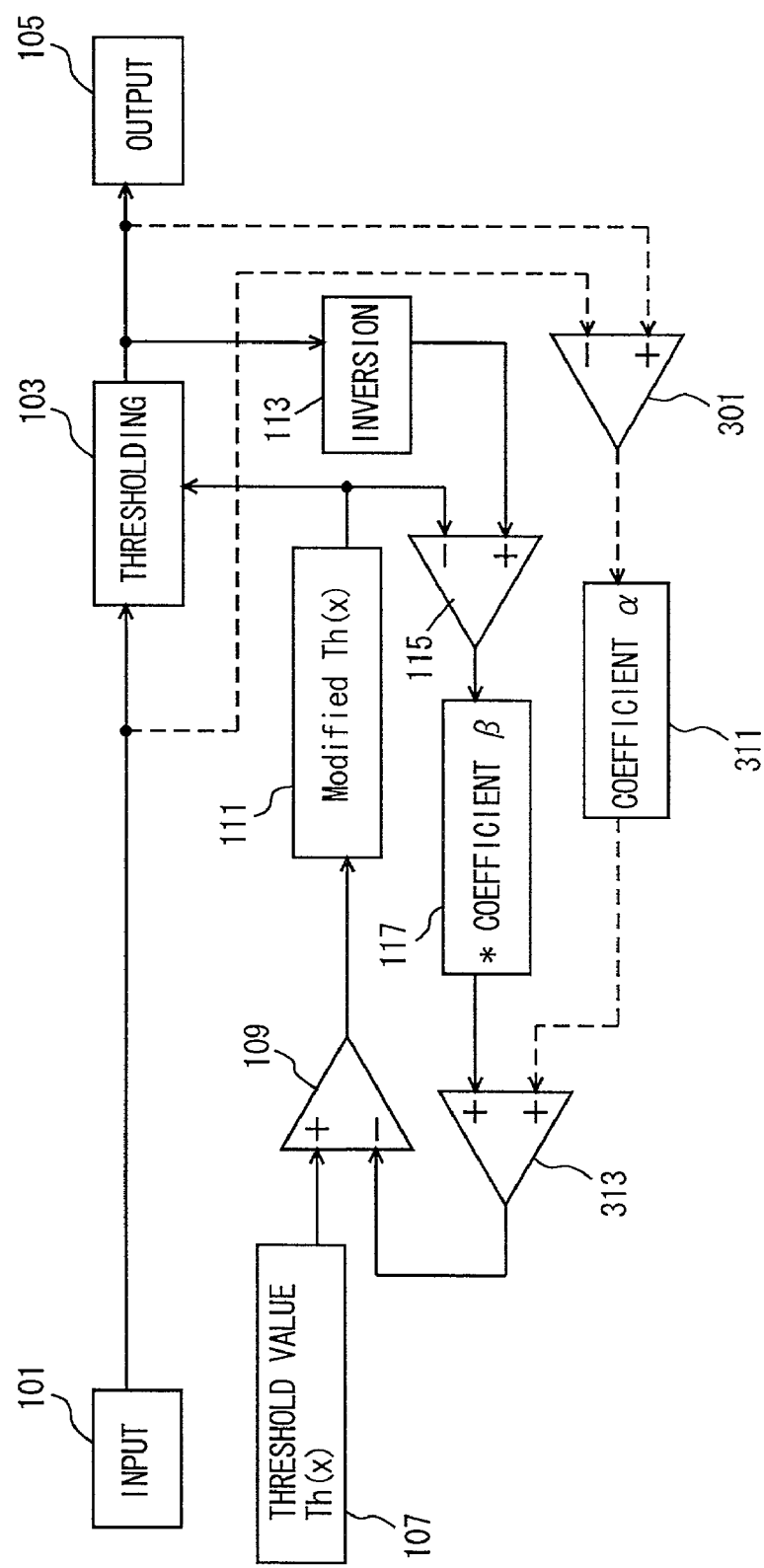
FIG. 24 is a block diagram representing a first modification of the image forming apparatus shown in FIG. 23.

FIG. 24 is a block diagram representing a first modification of the image forming apparatus shown in FIG. 23. Referring to the figure, according to this modification, in the image forming apparatus employing the threshold value diffusion method, a value obtained by multiplying the feedback value by the coefficient β is added to a value obtained by multiplying the difference between the input and the output by the coefficient α.

More specifically, referring to FIG. 24, in addition to the configuration shown in FIG. 1, the image forming apparatus includes: a subtracting unit 301 subtracting a value before thresholding process (input to the image forming apparatus) from the result of thresholding process (output of the image forming apparatus); a multiplying unit 311 multiplying the output of subtracting unit 301 by a coefficient α; and an adding unit 313 adding the output of multiplying unit 311 to the output of coefficient multiplying unit 117. The output of adding unit 313 is input to subtracting unit 109 as a feedback value. The correction value memory 119 of FIG. 1 is not shown in FIG. 24.

In this modification also, by appropriately adjusting the coefficients α and β, an edge enhancement characteristic desired by the user can be attained.

Figure 25:
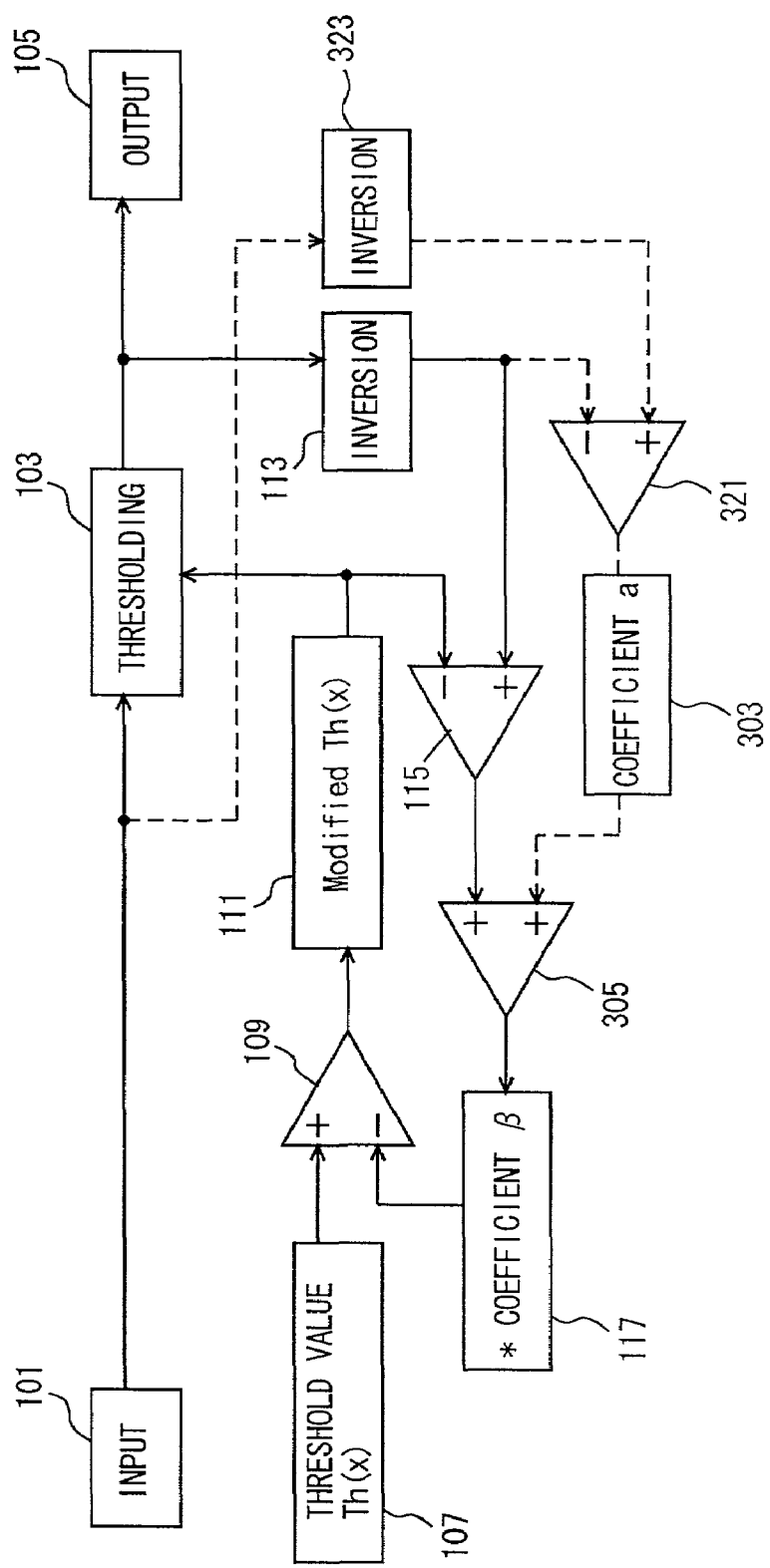
FIG. 25 is a block diagram representing a second modification of the image forming apparatus shown in FIG. 23.

FIG. 25 is a block diagram showing a second modification of the image forming apparatus shown in FIG. 23. In this modification, a value obtained by multiplying the difference between an inverted value of an input and an inverted value of an output by an appropriate coefficient a is added to the feedback value. By such a process, the degree of edge enhancement can be controlled.

Referring to FIG. 25, in addition to the configuration of the image forming apparatus shown in FIG. 1, the image forming apparatus in accordance with the present modification includes: an inverting unit 323 inverting an input; a subtracting unit 321 subtracting an output of inverting unit 113 from the output of inverting unit 323; a multiplying unit 303 multiplying the output of subtracting unit 321 by the coefficient a; and an adding unit 305 adding the output of multiplying unit 303 to the output of subtracting unit 115. The correction value memory 119 of FIG. 1 is not shown in FIG. 25.

In this modification also, by appropriately adjusting the coefficient a, the edge enhancement characteristic desired by the user can be attained.

Figure 26:
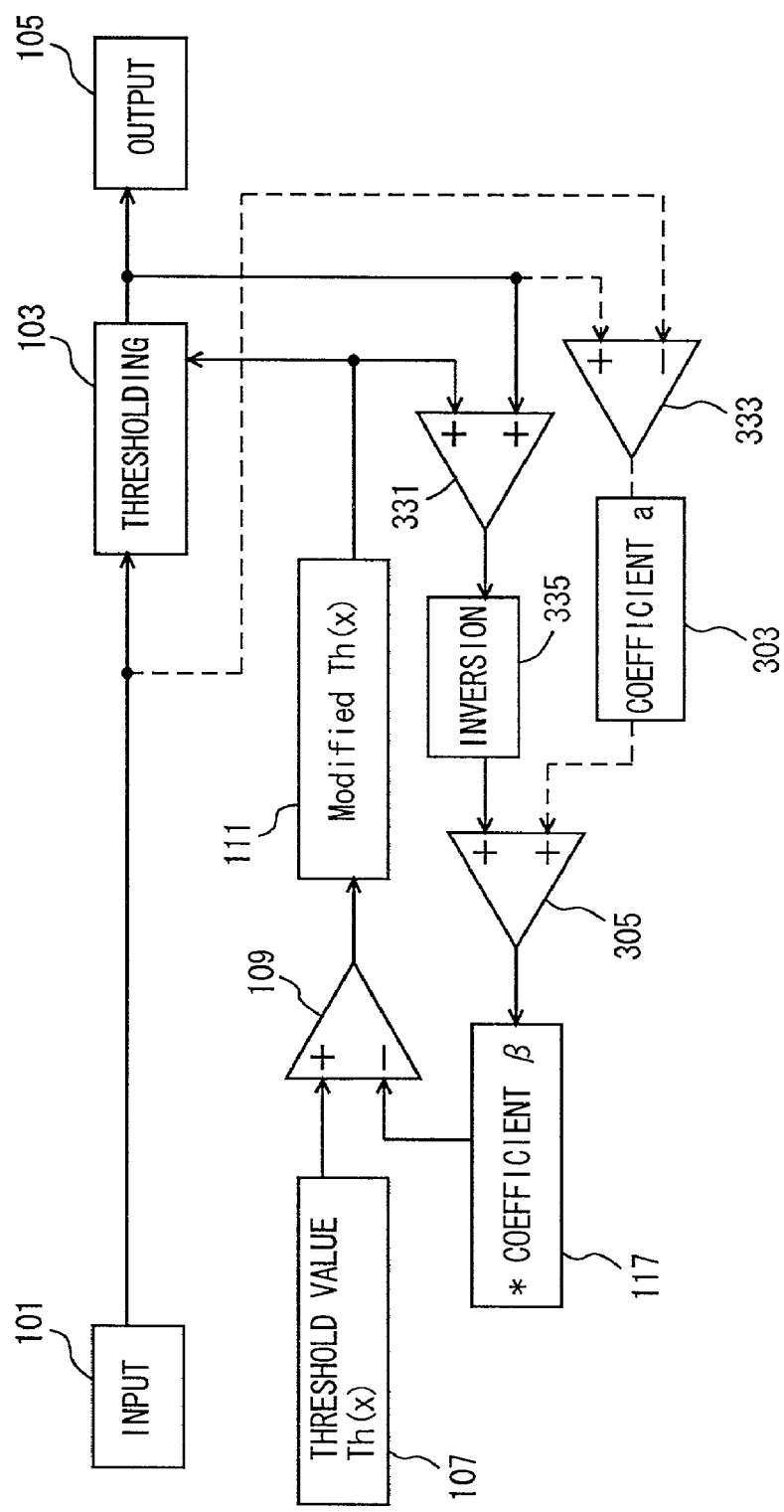
FIG. 26 is a block diagram representing a third modification of the image forming apparatus shown in FIG. 23.
Figure 29:
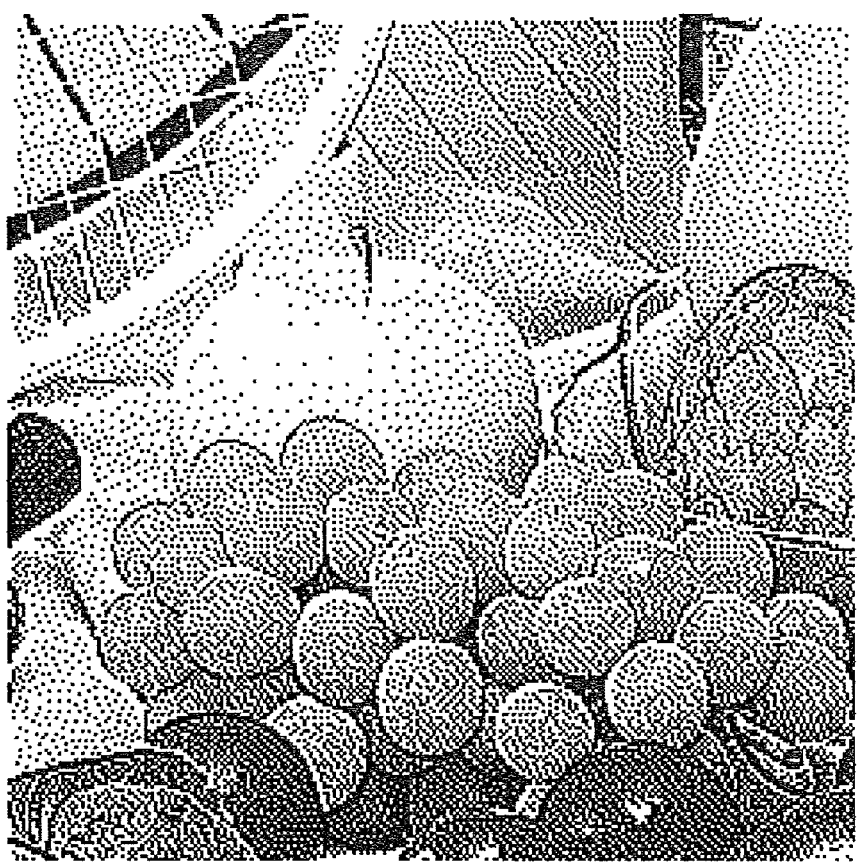
FIGS. 29 to 33 represent results of image processing in accordance with the second embodiment.
Figure 30:
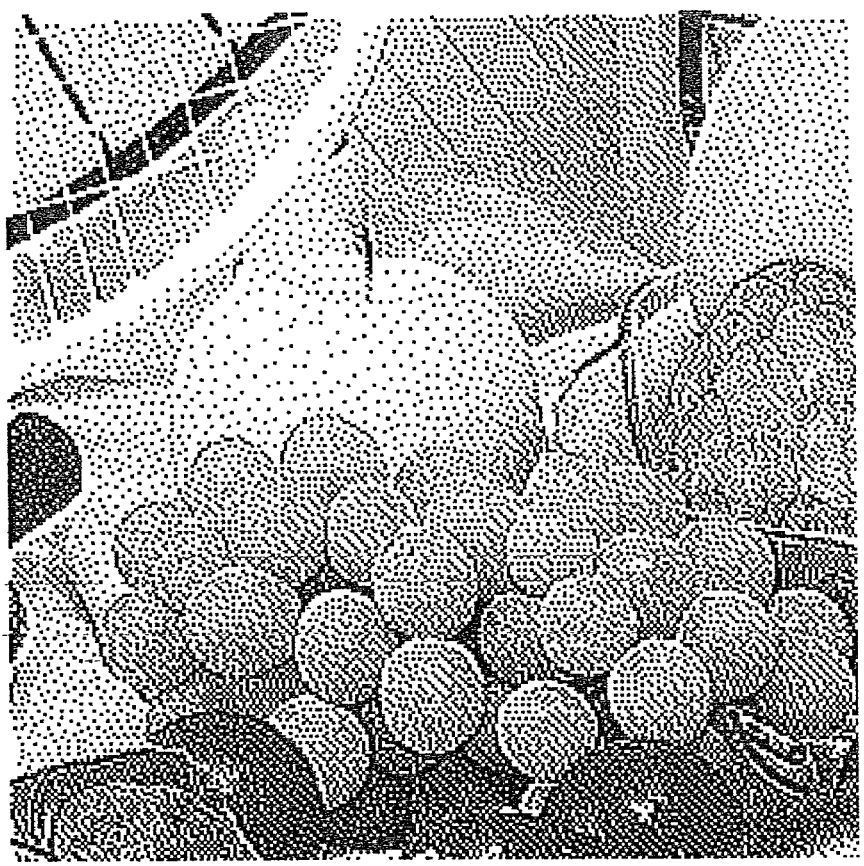
Figure 31:
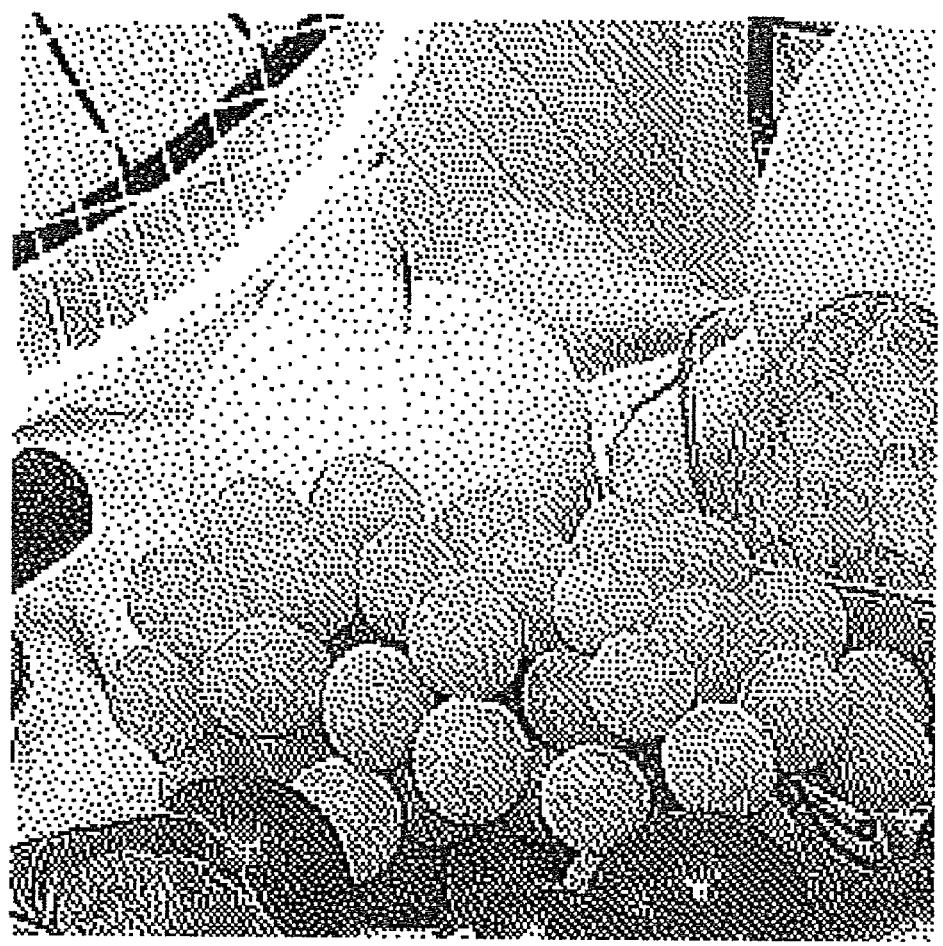
Figure 32:
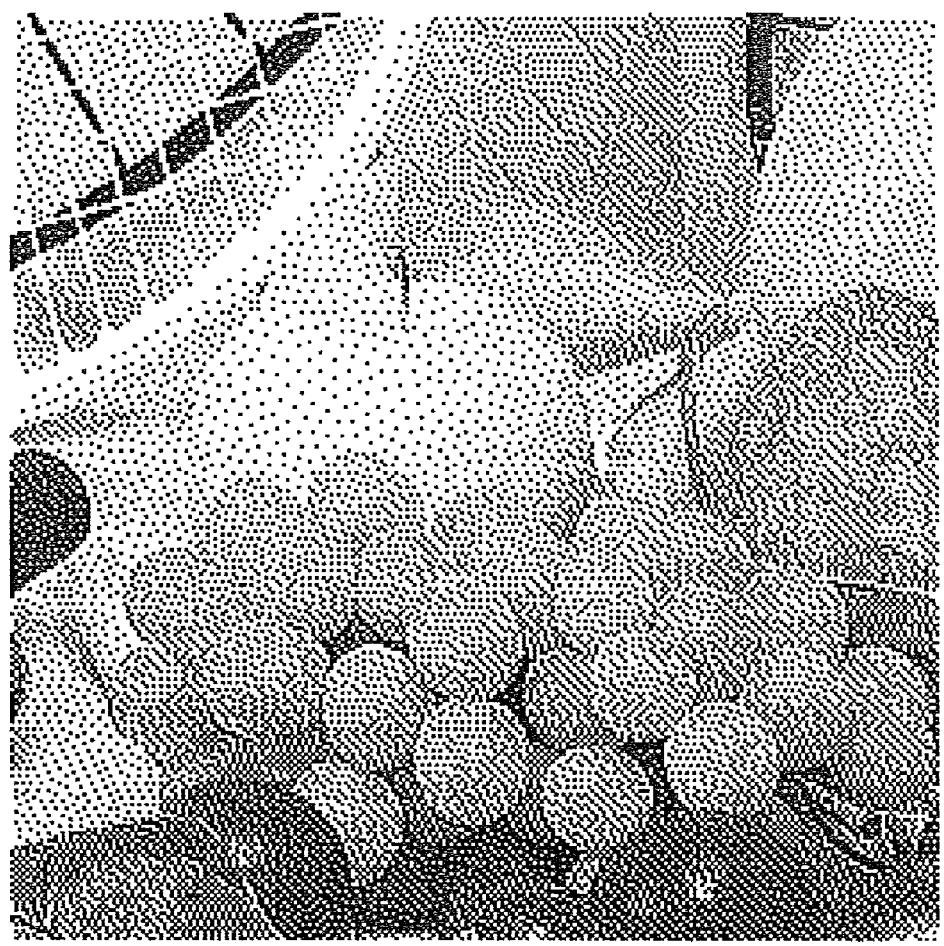
Figure 33:
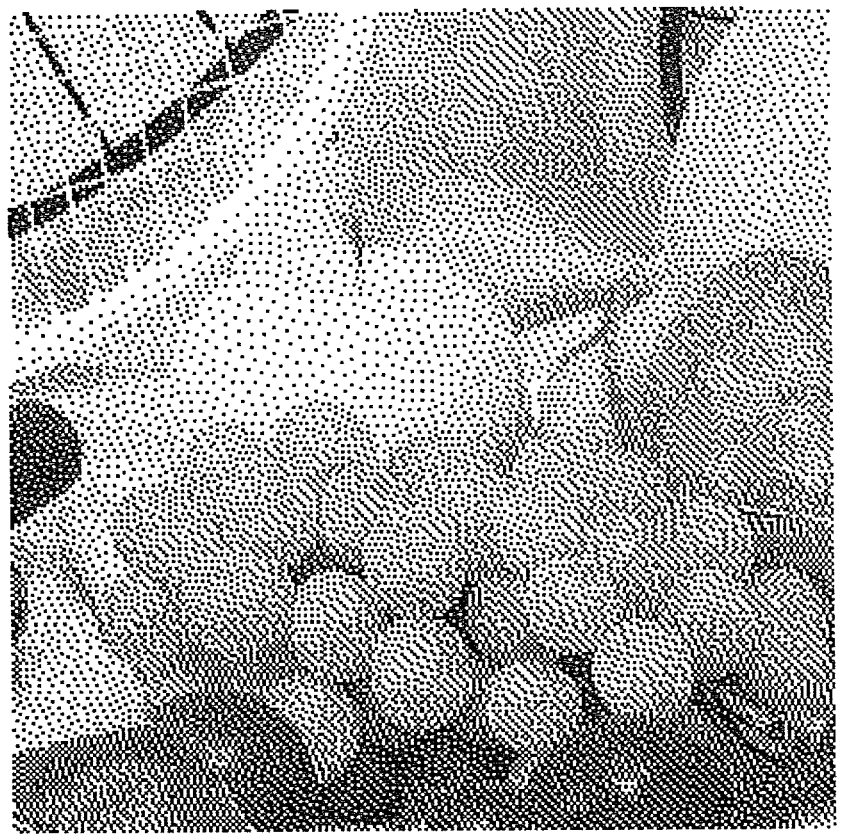

FIG. 26 is a block diagram representing a third modification of the image forming apparatus shown in FIG. 23.

Referring to FIG. 26, the image forming apparatus of the present modification has the inverting unit 113 and subtracting unit 115 of the image forming apparatus shown in FIG. 1 omitted. In addition to the configuration of the image forming apparatus shown in FIG. 1, the image forming apparatus of the present modification includes: an adding unit 331 adding the corrected threshold value and an output; an inverting unit 335 inverting the output of adding unit 331; a subtracting unit 333 subtracting an input to thresholding unit 103 from the output of thresholding unit 103; a multiplying unit 303 multiplying the output of subtracting unit 333 by the coefficient a; and an adding unit 305 adding the output of multiplying unit 303 to the output of inverting unit 335. The output of adding unit 305 is input to the coefficient multiplying unit 117. The correction value memory 119 of FIG. 1 is not shown in FIG. 26.

In the present modification, a value obtained by multiplying the difference between the input and the output by an appropriate coefficient a is added to the feedback value. In the process of the feedback, the position where the value is inverted and the like is changed. By such a processing also, the degree of edge enhancement can be controlled, by appropriately adjusting the coefficient a.

In the logic of the feedback route represented by the dotted lines in the image forming apparatus shown in FIGS. 23 to 26, it is possible to switch + and −, to add an inverting unit, to appropriately change the value or positive/negative signs of the coefficient, and to appropriately change the position of the coefficient multiplying unit. In this manner, an algorithm mathematically equivalent to the feedback route of FIGS. 23 to 26 can be formed.

Though the value of the coefficient is not limited, it is desired to efficiently control the edge enhancement characteristic that the value of the coefficient is set to a positive or a negative value as described, and when the coefficient is positive, a value not larger than 1 is desired, as will be discussed in the following. For example, referring to FIG. 27, it is necessary to set the value a to be a>0 to increase edge enhancement characteristic, and to a<0 to decrease the edge enhancement characteristic. When the value a is a=0, the process will be the same as the common threshold value diffusion (FIG. 1).

Examples of image processing in accordance with the present embodiment will be described in the following.

An input image of 256×256 pixels was processed with the value of the coefficient changed variously (a=0.5, 0.2, 0, −1, −5) as shown in the table of FIG. 28. The results of processing 1 to 5 are as shown in FIGS. 29 to 33. For comparison, an image representing the result of processing by the common error diffusion method is given in FIG. 34.

Regardless of the coefficient a, a standard value (a constant value of 0.5) was used as the feedback coefficient β. When the coefficient β is to be changed for other purposes, the coefficient a may be modified appropriately as needed.

As can be seen from FIGS. 29 to 33 representing the results of image processing, when the coefficient a is increased, the degree of edge enhancement increases. When the coefficient a is a=0, a standard threshold value diffusion process is attained, and when the coefficient a is set to a negative value, edge enhancement decreases.

From these results, it can be understood that the edge enhancement characteristic of the output image can effectively be controlled by changing the setting of the coefficients.

By the algorithm in accordance with the present embodiment, the degree of edge enhancement characteristic in the half toning process can be controlled by a simple process, and a halftone image quality as required by the user can be presented. As the method therefor, it is necessary for the user to simply set in advance or select at each operation a prescribed coefficient suitable for the desired degree. Further, simple operation such as selection of the coefficient suitable for the intention by the user is also possible when the image processing is executed.

It is needless to say that as compared with the system in which edge enhancement process is separately performed before half toning, the process in accordance with the present embodiment is simpler and imposes less burden.

[Third Embodiment]

Figure 35:
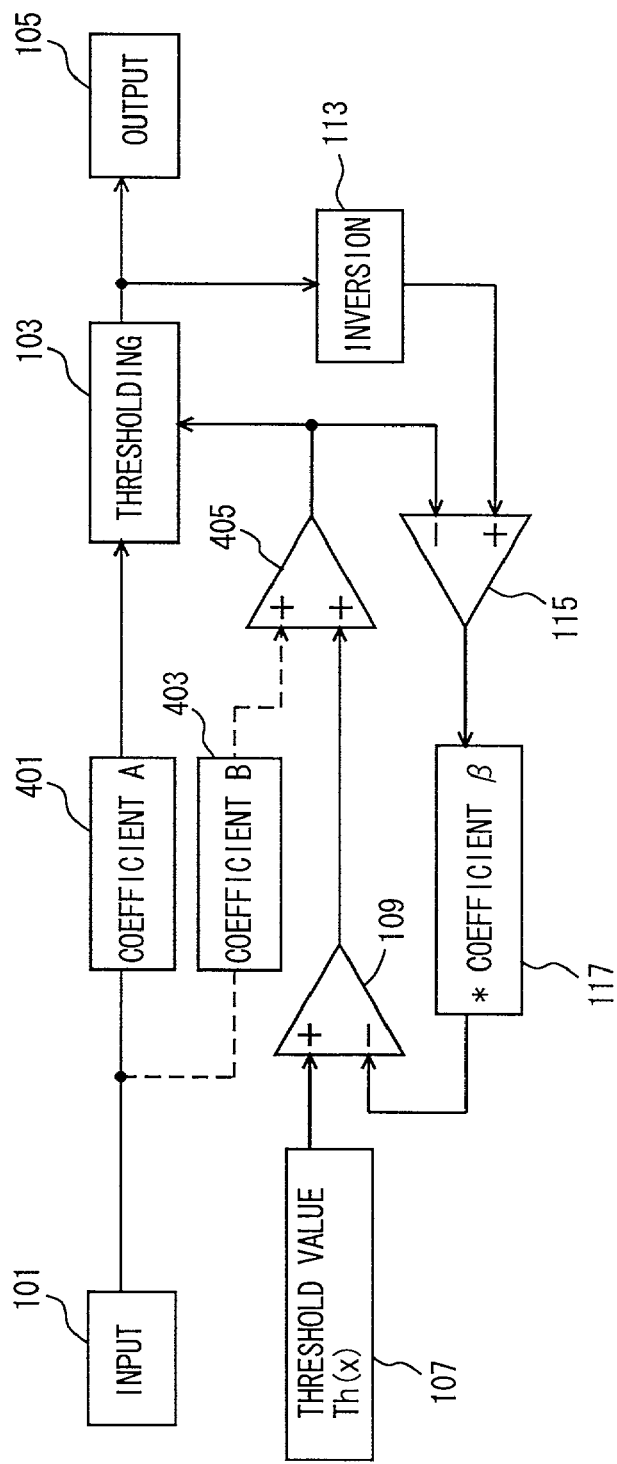
FIG. 35 is a block diagram representing a configuration of an image forming apparatus in accordance with a third embodiment of the present invention.

FIG. 35 is a block diagram showing a configuration of the image forming apparatus in accordance with the third embodiment of the present invention. Referring to FIG. 35, in the present invention, the apparatus includes, in addition to the configuration of the image forming apparatus shown in FIG. 1, a multiplying unit 401 multiplying an input by a coefficient A and providing the result to the thresholding unit 103; a multiplying unit 403 multiplying an input by a coefficient B and providing the result as an output; and an adding unit 405 adding the output of multiplying unit 403 to the output of subtracting unit 109 and providing the result as a corrected threshold value. More specifically, a route represented by the dotted line is added to the normal threshold value diffusion process (FIG. 1). Correction value memory 119 of FIG. 1 is not shown in FIG. 35.

In the present embodiment, in the feedback process of the threshold value preceding the thresholding process, the input of the image forming apparatus is added. Further, the input before thresholding process is multiplied by a coefficient. By appropriately changing the amount of addition of the input and the coefficients, the degree of edge enhancement can be adjusted.

Here, the coefficient B is the coefficient for the input added to the corrected threshold value, and a coefficient A is for the original input. The coefficients may be positive or negative.

Dependent on the combination of coefficients A and B, the degree of increase or decrease of edge enhancement changes. Basically, when the values of coefficients A and B increase, the degree of edge enhancement increases, and when the values of the coefficients decrease, the degree of edge enhancement decreases. Therefore, the user sets coefficients A and B to have a set of specific values set in advance in accordance with the desired degree of edge enhancement characteristic. When the coefficient β is to be changed, the values of coefficients A and B may be calculated accordingly. Alternatively, sets of coefficient values may be prepared in advance in the form of a table data, and a set preferable for the value β may be selected.

When the degree of edge enhancement is to be changed in accordance with the feature of the image or area by area of the image, the combination of the coefficients may be changed in accordance with the input/output or parameters representing the feature.

It is possible to form a different operating circuit that is mathematically equivalent to that of FIG. 35, as an algorithm. Such circuits are also covered by the present invention. More specifically, in the configuration shown in FIG. 35, it is possible to form a mathematically equivalent algorithm by switching + and − of the logic, changing or adding the position of inversion, changing positive/negative signs or values of the coefficients or changing the position where the coefficients are multiplied. More specifically, the present invention can be implemented in the threshold value diffusion method when adjustment is made possible by adding an input to the process of feedback of the threshold value before thresholding process and by multiplying each of the added value and the original input value by respective coefficients.

Figure 36:
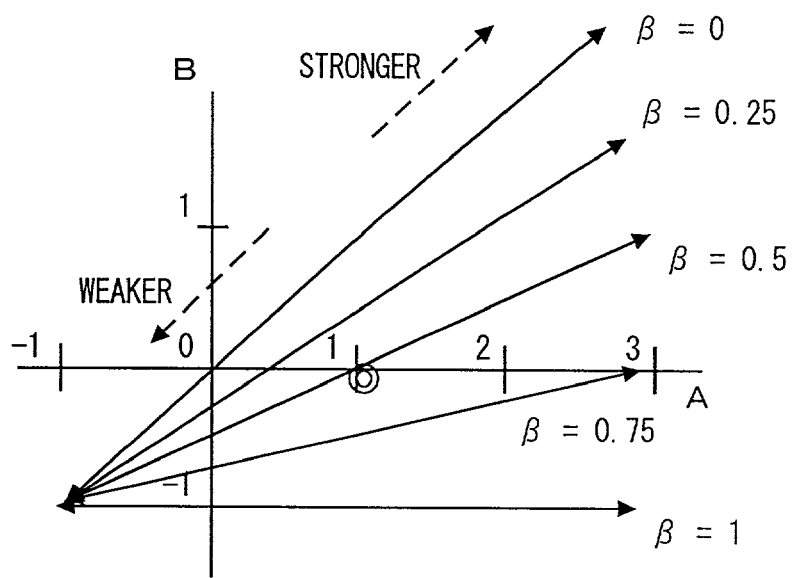
FIG. 36 shows a relation between the coefficient and edge intensity.
Figure 39:
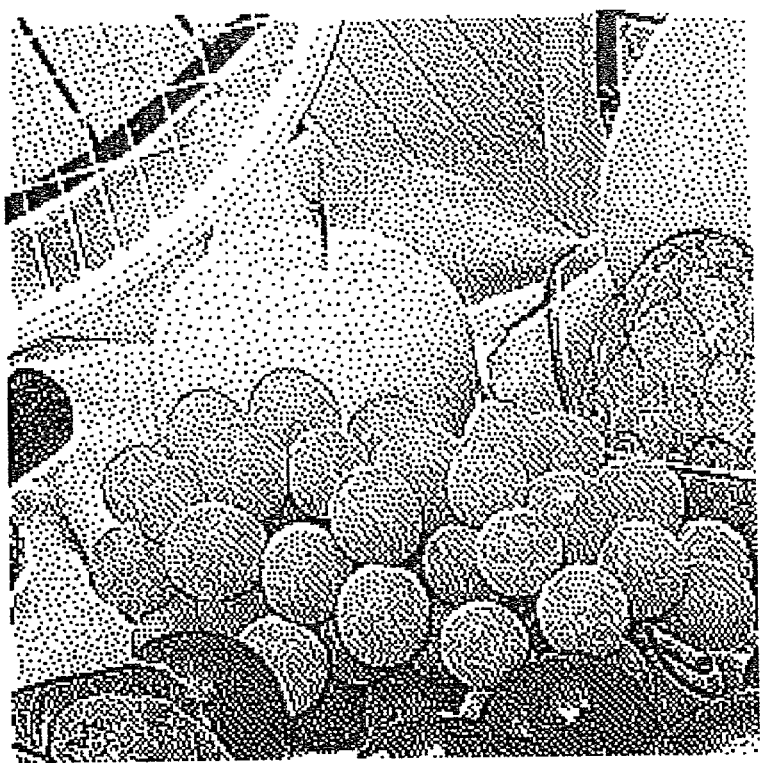
FIGS. 39 to 43 represent results of image processing in accordance with the third embodiment.
Figure 40:
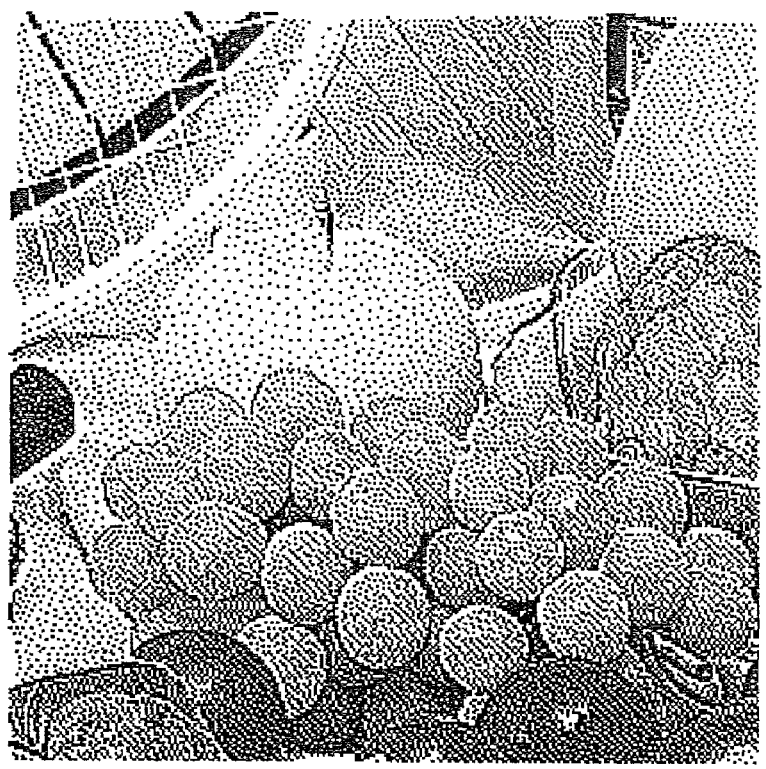
Figure 41:
Figure 42:
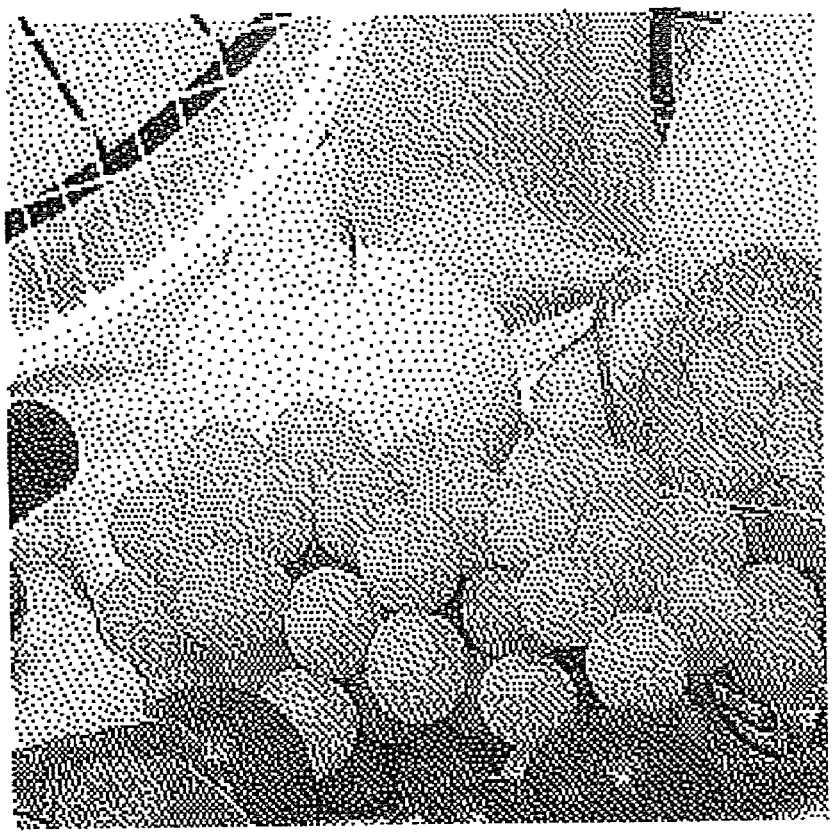
Figure 43:
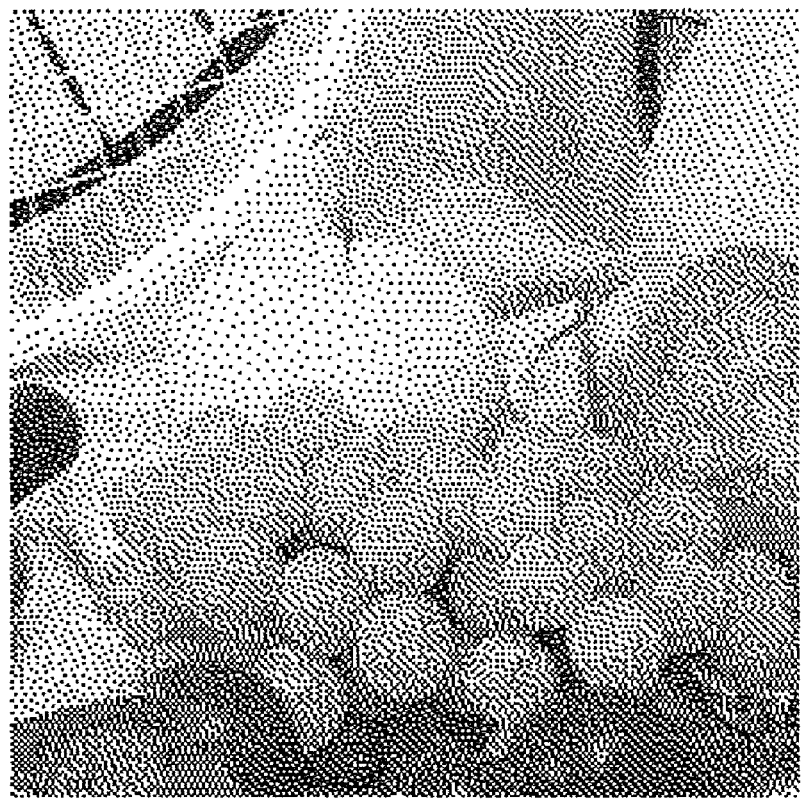
Figure 45:
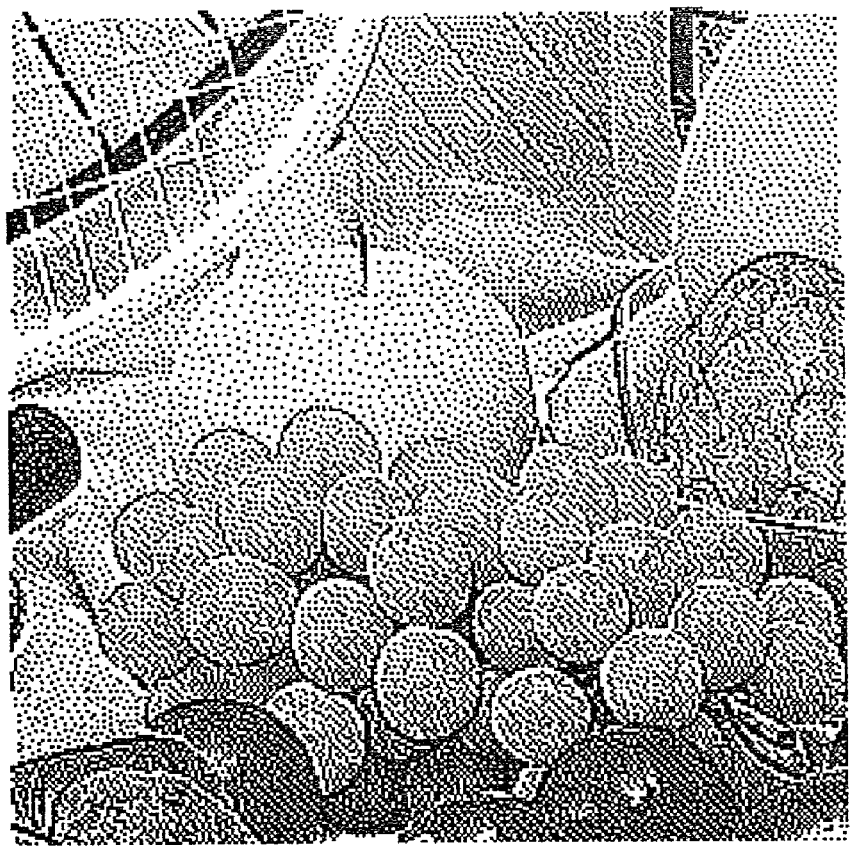
FIGS. 45 to 48 show results of image processing in accordance with the third embodiment.
Figure 46:
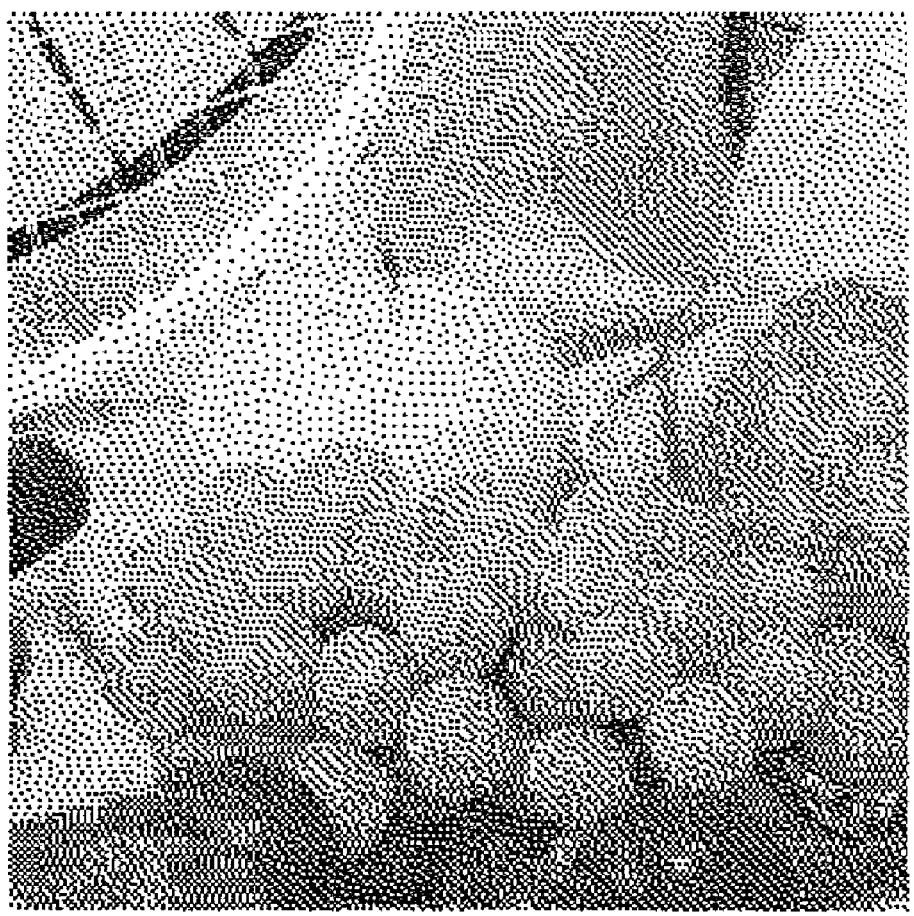
Figure 47:
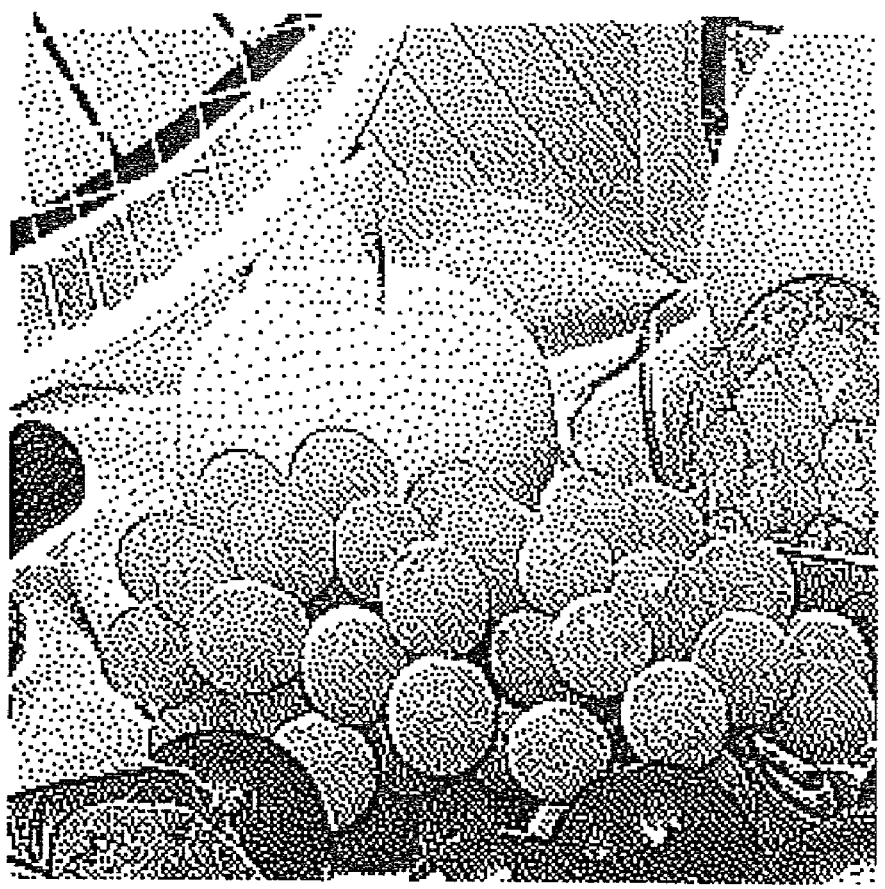
Figure 48:
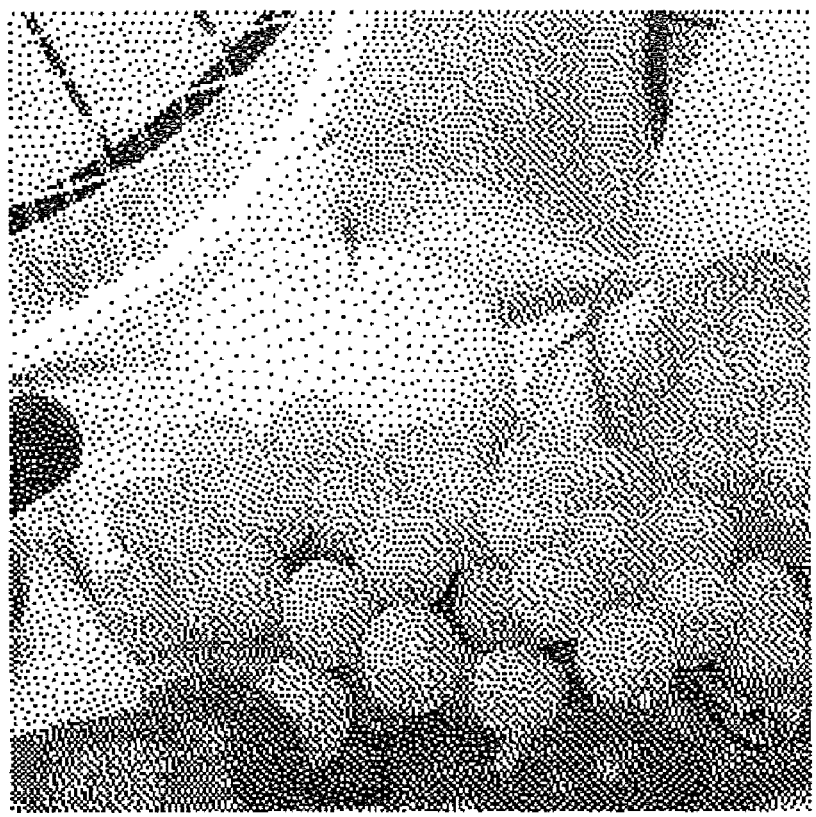

FIG. 36 shows an example of the relation between the set coefficient values and the degree of edge enhancement.

Basically, an example represented by the double circle in the figure where coefficients are A=1 and B=0 represents the standard threshold value diffusion (FIG. 1). There is a relation that as the values of coefficients A and B increase, degree of edge enhancement increase and when the values decrease, the degree of edge enhancement decreases. The combination of coefficients A and B is not uniquely determined with respect to the degree of edge enhancement. As there are two values, the method of setting coefficients A and B with respect to the change in coefficient β may have a tolerance.

An appropriate value may be used as the coefficient β, in accordance with the user's intention. When the value β is β=0.5, a standard threshold value diffusion is attained. When the value is set to β=0, substantially, there is no reproduction of gradation. Therefore, the value should be β>0.

For a different value of β, a different combination of coefficients A and B is appropriate. Examples of preferable combinations of the coefficients with respect to the value β are as shown in FIG. 37. Desirably, the coefficients satisfy the following equation.

$$\beta = (A-B)/(1+A)$$

When represented by the relation of A and B, this equation will be $$B = (1-\beta)A - \beta$$

The relation between each of the values A, B and β derived from the equation is represented by the lines in FIG. 36.

Figure 34:
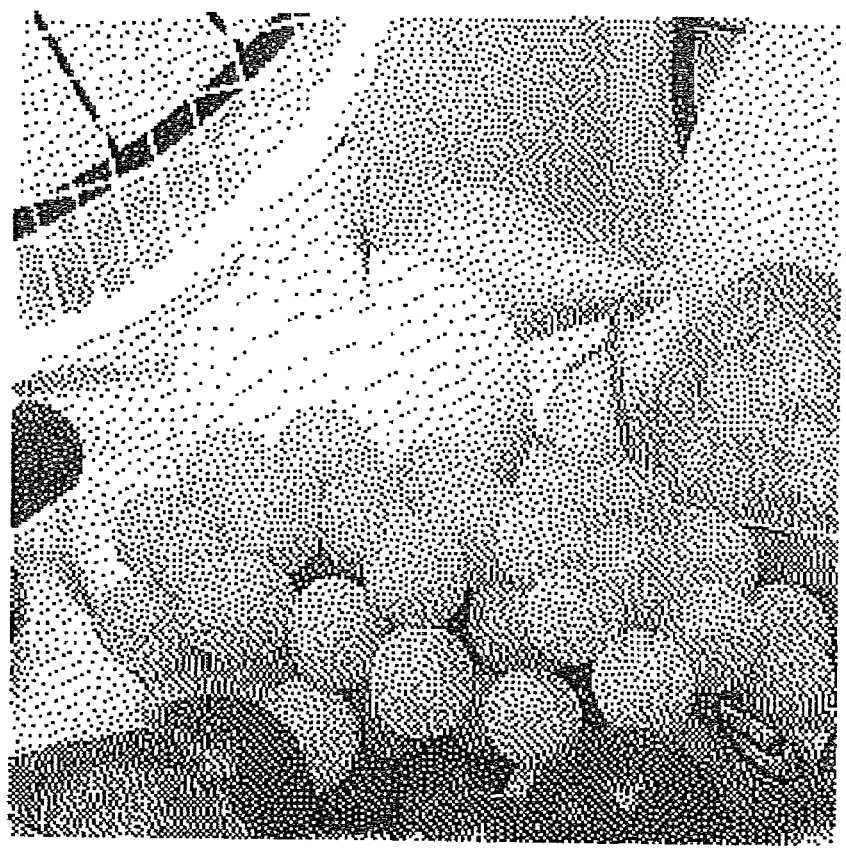
FIG. 34 shows the result of image processing in accordance with the error diffusion method.

FIG. 38 shows the examples of set coefficients, and the resulting images 1 to 5 are as shown in FIGS. 39 to 43. An input image of 256×256 pixels was processed under the conditions represented by the coefficients shown in FIG. 38. The image obtained by the common error diffusion method for comparison is shown in FIG. 34.

There are five images, in addition to the one obtained by error diffusion, in which the values of coefficient sets are different. The feedback coefficient β is set to a standard value (a constant value of 0.5). When coefficient β is to be changed for other purposes, the coefficients A and B may be appropriately changed as needed.

Referring to FIGS. 39 to 43, it is understood that from Result 1 to Result 5, edge enhancement characteristic gradually decreases. When the coefficients A and B are set to A=1 and B=0, a standard threshold value diffusion process (FIG. 1) is attained.

From these results, it is understood that by changing the setting of the coefficients, the edge enhancement characteristic of the output image can effectively be controlled.

FIGS. 45 to 48 show Results 6 to 9 when the coefficients β and A and B are changed as shown in FIG. 44. From these results, it is understood that edge enhancement characteristic differs when the coefficient β differs, even if the coefficients A and B are the same.

As described above, by the algorithm of the present embodiment, it is possible to control the degree of edge enhancement characteristic in the half toning process by a simple process. Thus, a halftone image quality required by the user can be provided. As the method therefor, what is necessary for the user is to simply set in advance or select at each operation a prescribed set of coefficients as desired. Further, it is possible to perform a simple process of selecting a set of coefficients suitable for the user's intention, at the time of executing the image processing.

The algorithm in accordance with the above described embodiment is applied when an image is to be formed for an apparatus outputting digital images such as a printer, a display or the like, or when an input image data is converted to an output image data for an output apparatus. Further, the present invention can effectively applied when gradation level of the output is limited and a so-called half toning process is necessary, or when there is an individual request for output resolution characteristic. In such a case, it becomes possible to perform a necessary process in a simple manner with less burden, while an output image of required good image quality is provided.

Though conversion of an input image of 256 gradations to an output image of two gradations has been discussed above, it is possible to convert an arbitrary input gradation to an arbitrary output gradation, by the similar method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
    an input unit successively inputting a first image signal representing density level of each pixel;
    a thresholding unit generating a second image signal by comparing the first image signal input from said input unit with a threshold value;
    a calculating unit calculating, based on the second image signal generated by said thresholding unit and the threshold value used for generating the second image signal, a threshold value to be used for thresholding a succeeding pixel; and a changing unit for enlarging or reducing at least one of a range of the first image signal input from said input unit and range of the threshold value calculated by said calculating unit.

2. The image processing apparatus according to claim 1, wherein
said changing unit changes the range of the first image signal input from said input unit, and includes a variable unit changing a coefficient used for changing the range.

3. The image processing apparatus according to claim 2, wherein method of calculating the threshold value by said calculating unit is changed in accordance with the coefficient changed by said variable unit.

4. The image processing apparatus according to claim 1, wherein
said changing unit changes the range of the threshold value calculated by said calculating unit, and includes a variable unit changing a coefficient used for changing the range.

5. The image processing apparatus according to claim 4, wherein method of calculating the threshold value by said calculating unit is changed in accordance with the coefficient changed by said variable unit.

6. A method of image processing, comprising:
an input step of successively inputting a first image signal representing density level of each pixel;
a thresholding step of generating a second image signal by comparing the first image signal input in said input step with a threshold value;
a calculating step of calculating, based on the second image signal generated in said thresholding step and the threshold value used for generating the second image signal, a threshold value to be used for thresholding of a succeeding pixel; and
a changing step of enlarging or reducing at least one of a range of the first image signal input in said input step and a range of the threshold value calculated in said calculating step.

7. An image processing apparatus, comprising:
an input unit successively inputting a first image signal representing density level of each pixel;
a thresholding unit generating a second image signal by comparing the first image signal input from the input unit with a threshold value;
a calculating unit calculating, based on the second image signal generated by said thresholding unit and the threshold value used for generating the second image signal, a threshold value to be used for thresholding a succeeding pixel; and
a changing unit changing ratio of a range of the first image signal input from said input unit and a range of the threshold value calculated by said calculating means.

8. An image processing apparatus comprising:
an input unit successively inputting a first image signal representing density level of each pixel;
a thresholding unit generating a second image signal by comparing the first image signal input from said input unit with a threshold value; and
a calculating unit calculating, based on said first image signal, said second image signal and the threshold value used for generating said second image signal, a threshold value to be used for thresholding a succeeding pixel;
wherein said calculating means calculates the threshold value using difference between said second image signal and the threshold value used for generating said second image signal and difference between said first image signal and said second image signal, as parameters.

9. The image processing apparatus according to claim 8, wherein difference between said first image signal and said second image signal is multiplied by a prescribed coefficient.

10. The image processing apparatus according to claim 9, wherein
said coefficient can be arbitrarily changed.

11. An image processing apparatus comprising:
an input unit successively inputting a first image signal representing density level of each pixel;
a thresholding unit generating a second image signal by comparing the first image signal input from said input unit with a threshold value;
a calculating unit calculating, based on said first image signal, said second image signal and the threshold value used for generating said second image signal, a threshold value to be used for thresholding a succeeding pixel;
a first multiplying unit multiplying the first image signal input to said thresholding unit by a prescribed first coefficient, and
a second multiplying unit multiplying the first image signal input to said calculating unit by a prescribed second coefficient.

12. The image processing apparatus according to claim 11, wherein at least one of said first and second coefficients can be arbitrarily changed.

13. An image processing apparatus, comprising:
an input unit successively inputting a first image signal representing density level of each pixel;
first multiplying unit multiplying said input first image signal by a prescribed first coefficient;
a second multiplying unit multiplying said input first image signal by a prescribed second coefficient;
a thresholding unit generating a second image signal by comparing an output of said first multiplying unit with a threshold value including an output of said second multiplying unit; and
a calculating unit calculating, based on the second image signal generated by said thresholding unit and a threshold value used for generating the second image signal, a threshold value to be used for thresholding a succeeding pixel.

14. The image processing apparatus according to claim 13, wherein
at least one of said first and second coefficients can be set by a user.

15. The image processing apparatus according to claim 13, wherein said first and second coefficients are changed in accordance with an area or feature of an image.

* * * * *